US012618931B2

(12) United States Patent　(10) Patent No.:　US 12,618,931 B2

Morrin et al.　(45) Date of Patent:　May 5, 2026

(54) STATEFUL POST-LOCATION ADJUSTMENTS

(71) Applicant: QUALCOMM Incorporated, San Diego, CA (US)

(72) Inventors: Joel Morrin, North Reading, MA (US); George Wilcox Resor, Wilson, WY (US); Satyanarayana Yarramsetty, Spring City, PA (US); Samia Zaman, Chesterbrook, PA (US); Larry Vincent Dodds, Chester Springs, PA (US)

(73) Assignee: QUALCOMM Incorporated, San Diego, CA (US)

( * ) Notice: Subject to any disclaimer, the term of this patent is extended or adjusted under 35 U.S.C. 154(b) by 313 days.

(21) Appl. No.: 18/452,488

(22) Filed: Aug. 18, 2023

(65) Prior Publication Data

US 2025/0060448 A1　Feb. 20, 2025

(51) Int. Cl.
*G01S 5/02*　(2010.01)
*H04W 64/00*　(2009.01)

(52) U.S. Cl.
CPC ........... *G01S 5/021* (2013.01); *H04W 64/006* (2013.01)

(58) Field of Classification Search
CPC ...................................................... G01S 5/021
USPC ...................................................... 455/456.1
See application file for complete search history.

(56) References Cited

U.S. PATENT DOCUMENTS

| 2012/0136865 | A1 * | 5/2012 | Blom | ...................... | G06F 16/29 |
| | | | | | 707/E17.046 |
| 2015/0073702 | A1 * | 3/2015 | Jouaux | ................... | G01C 21/26 |
| | | | | | 701/519 |
| 2015/0350836 | A1 * | 12/2015 | Smith | ................... | H04W 4/025 |
| | | | | | 455/456.1 |
| 2021/0368297 | A1 * | 11/2021 | Lin | ....................... | H04W 64/00 |

OTHER PUBLICATIONS

International Search Report and Written Opinion—PCT/US2024/041437—ISA/EPO—Oct. 29, 2024—11 pages.

* cited by examiner

*Primary Examiner* — Qutbuddin Ghulamali
(74) *Attorney, Agent, or Firm* — QUALCOMM Incorporated

(57) ABSTRACT

Apparatus, methods, and computer program products for providing location to a device are provided. An example method may include receiving a location request associated with a device. The example method may further include determining a current raw location and a device history associated with the device. The example method may further include determining, based on the current raw location and the device history, at least one processing algorithm. The example method may further include determining an adjusted location based on the current raw location, the device history, and the at least one processing algorithm. The example method may further include transmitting, for the device, a location response including the adjusted location.

30 Claims, 13 Drawing Sheets

$\Phi$ = Azimuth angle of departure (A-AoD)
$\theta$ = Zenith angle of departure (Z-AoD)
$\rho$ = Distance
$\Phi'$ = Azimuth angle of arrival (A-AoA)
$\theta'$ = Zenith angle of arrival (Z-AoA)

STATEFUL POST-LOCATION ADJUSTMENTS

TECHNICAL FIELD

The present disclosure relates generally to communication systems, and more particularly, to wireless communication systems with a location server that may be providing location service to devices.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies. The improvements may also be applicable to devices based on wired communications.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a device are provided. The apparatus may include at least one memory and at least one processor coupled to the at least one memory. Based at least in part on information stored in the at least one memory, the at least one processor, individually or in any combination, is configured to obtain a current raw location and a device history associated with the device. Based at least in part on information stored in the at least one memory, the at least one processor, individually or in any combination, is configured to determine, based on the current raw location and the device history, at least one processing algorithm. Based at least in part on information stored in the at least one memory, the at least one processor, individually or in any combination, is configured to determine an adjusted location based on the current raw location, the device history, and the at least one processing algorithm. In some aspects, based at least in part on information stored in the at least one memory, the at least one processor, individually or in any combination, is configured to cause a screen at the apparatus to render the adjusted location.

In another aspect of the disclosure, a method, a computer-readable medium, and an apparatus at a location server are provided. The apparatus may include at least one memory and at least one processor coupled to the at least one memory. Based at least in part on information stored in the at least one memory, the at least one processor, individually or in any combination, is configured to receive a location request associated with a device. Based at least in part on information stored in the at least one memory, the at least one processor, individually or in any combination, is configured to determine a current raw location and a device history associated with the device. Based at least in part on information stored in the at least one memory, the at least one processor, individually or in any combination, is configured to determine, based on the current raw location and the device history, at least one processing algorithm. Based at least in part on information stored in the at least one memory, the at least one processor, individually or in any combination, is configured to determine an adjusted location based on the current raw location, the device history, and the at least one processing algorithm. Based at least in part on information stored in the at least one memory, the at least one processor, individually or in any combination, is configured to transmit, for the device, a location response including the adjusted location.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
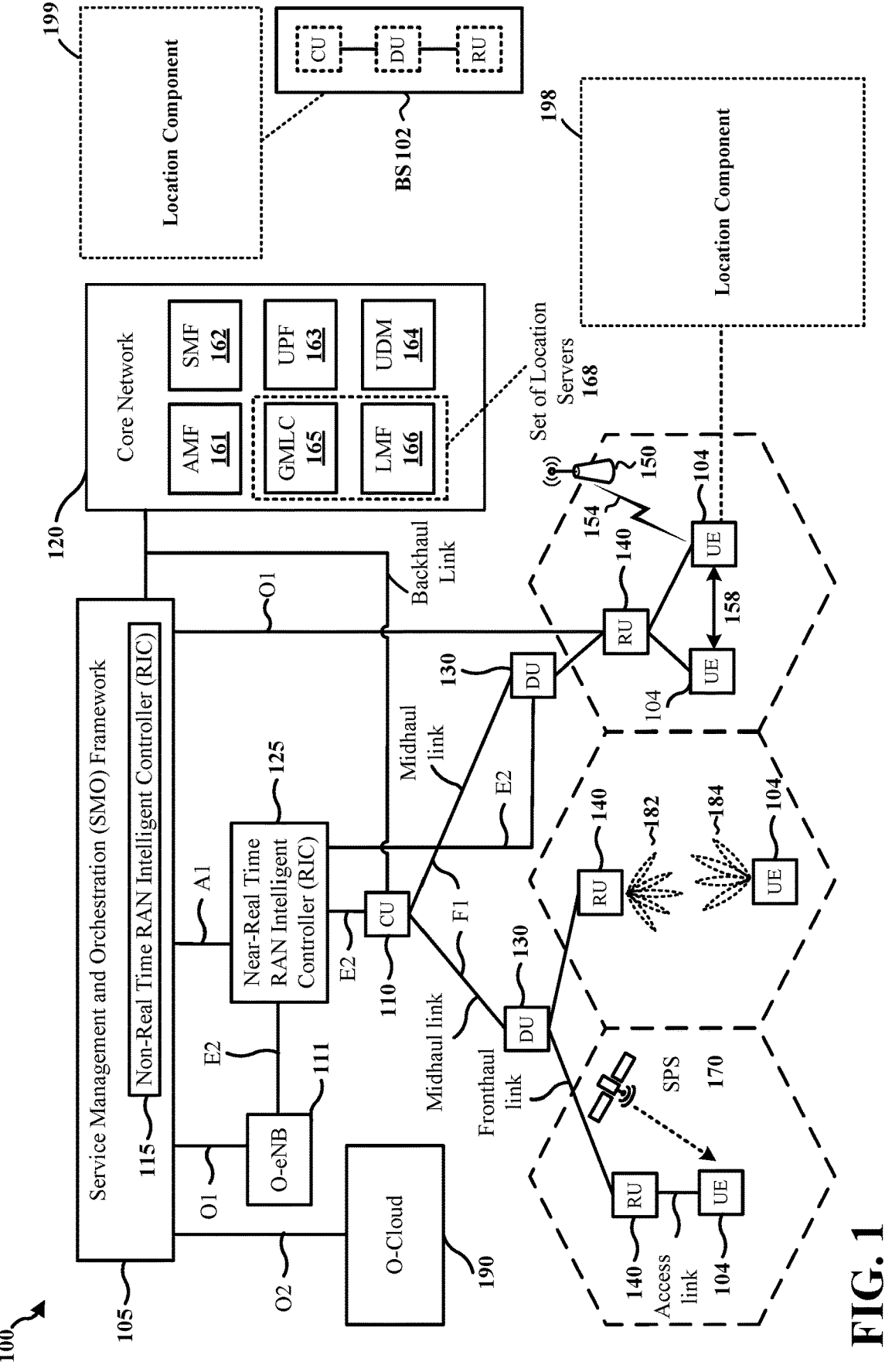
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

When device scans are processed into raw location results, there may be an innate statistical uncertainty in the result caused by which subset of the potentially observable beacons are seen, the total quantity of beacons observed in a scan, systematic and random error contributing to knowledge of those beacons, and systematic and random error contributing to the final calculated position. To improve accuracy of location estimation, information regarding motion status (e.g., speed, acceleration, or the like), of a device may be used to improve location estimate over multiple samples of raw locations. For example, if a device is known to be stationary, one or more raw locations that scatter around an area associated with that device may be potentially false. Device history may also be used to improve accuracy of location estimate by enabling filtering of incorrect raw location samples that may produce flyaway outliers (e.g., outliers that are too far away from a determined location based on a distance threshold or a motion status). Aspects provided herein may enable generation of adjusted location that reduces random error associated with device positioning and mitigate the effects of error in beacon positions. In some aspects, various information may be aggregated processing algorithms, such as precision-contextualized algorithms, may be applied to reduce the random error associated with device positioning and mitigate the effects of error in beacon positions when those error sources are independent. When device state information exists, locations derived from the most recent observations are passed through a stateful adjustments pipeline that uses prior and current information to calculate precision-contextualized ranging and perform a stationary assessment. The results of these calculations along with the raw scan data and the device state information may be fed into a process that selects the appropriate accuracy enhancement algorithm(s).

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a location component 198. In some aspects, the location component 198 may be configured to obtain a current raw location and a device history associated with the device. In some aspects, the location component 198 may be configured to determine, based on the current raw location and the device history, at least one processing algorithm. In some aspects, the location component 198 may be configured to determine an adjusted location based on the current raw location, the device history, and the at least one processing algorithm.

In certain aspects, the base station 102 may be in communication with a location component 199. In some aspects, the location component 199 may be configured to receive a location request associated with a device. In some aspects, the location component 199 may be further configured to determine a current raw location and a device history associated with the device. In some aspects, the location component 199 may be further configured to determine, based on the current raw location and the device history, at least one processing algorithm. In some aspects, the location component 199 may be further configured to determine an adjusted location based on the current raw location, the device history, and the at least one processing algorithm. In some aspects, the location component 199 may be further configured to transmit, for the device, a location response including the adjusted location.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figures 2A, 2B, 2C, 2D:
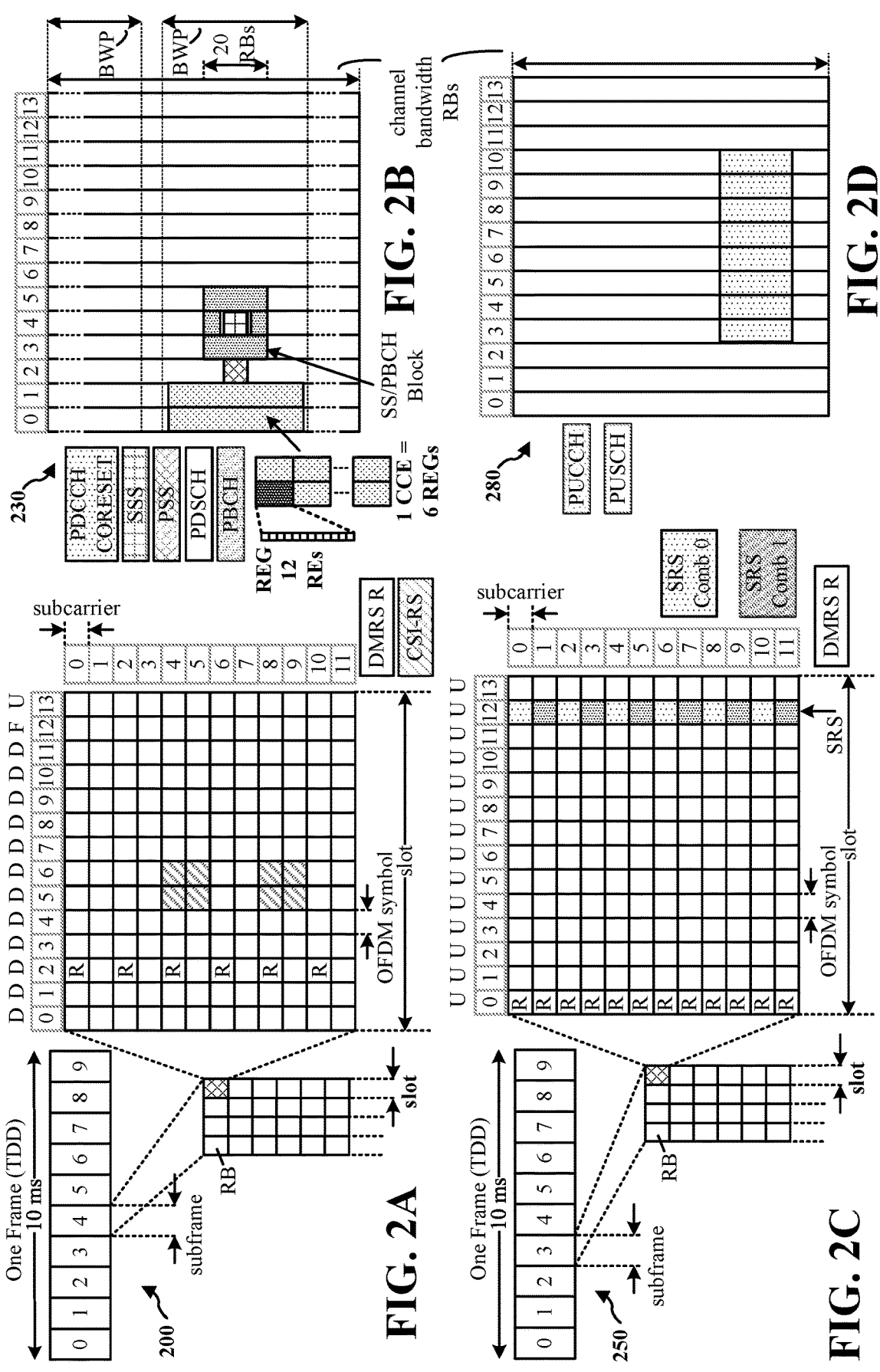
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| μ | SCS $\Delta f = 2^{\mu} \cdot 15$ [kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
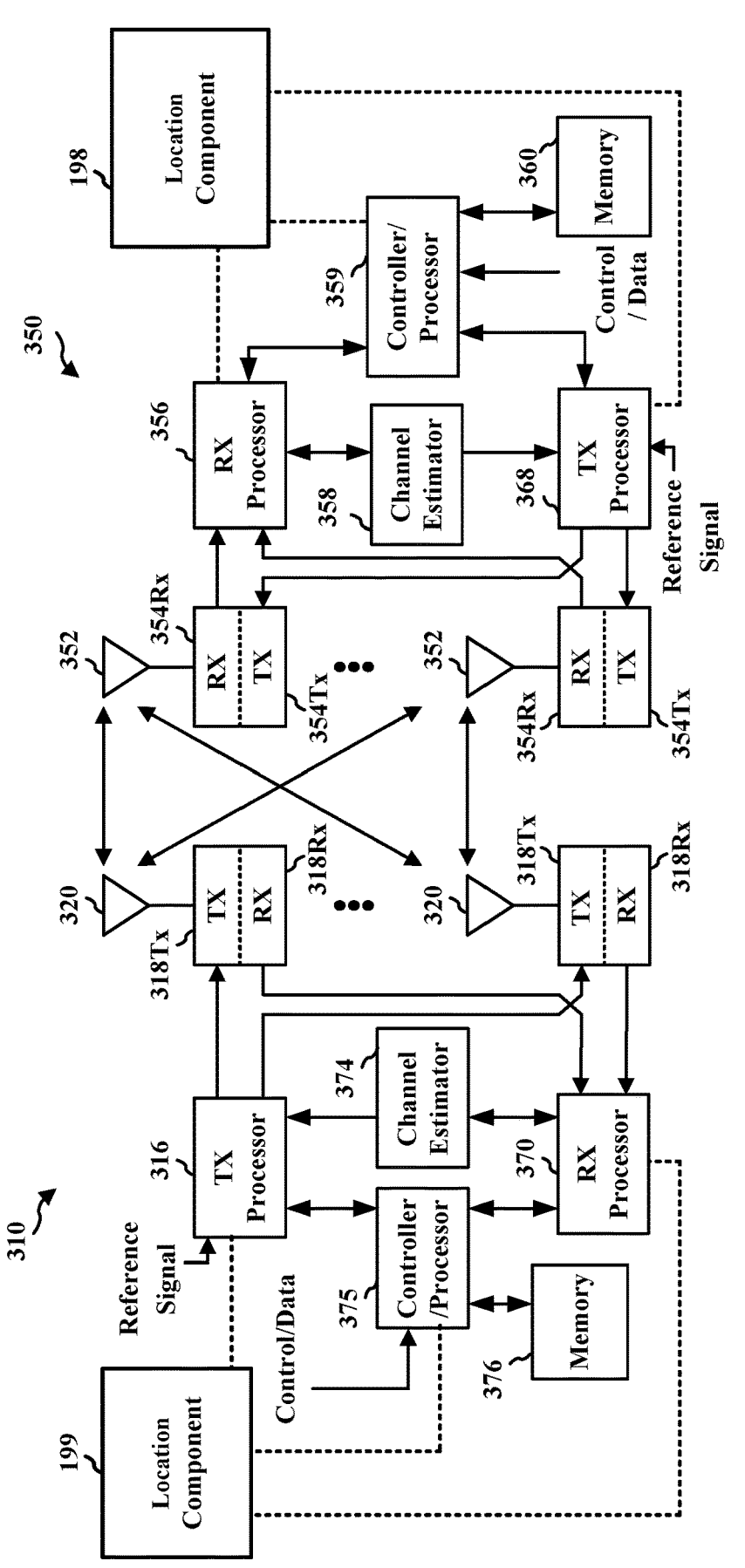
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with location component 198 of FIG. 1.

At least one of the TX processor 316, the RX processor 370, and the controller/processor 375 may be configured to perform aspects in connection with location component 199 of FIG. 1.

Figure 4:
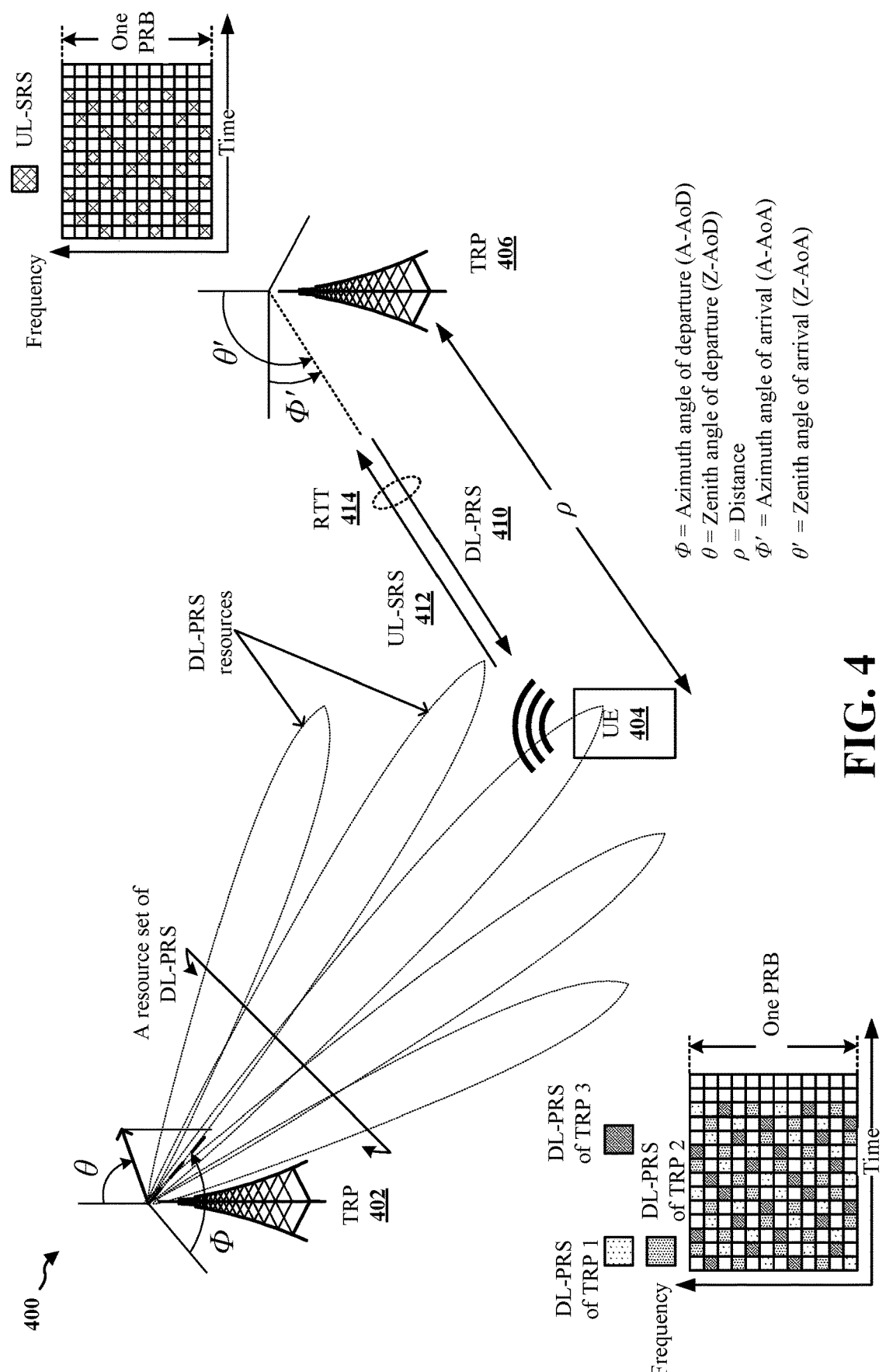
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_RX}-T_{PRS\_TX}|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

A location server may provide a location associated with a device to the device, such as by transmitting location information associated with the device via one or more intermediary servers, network entities, network nodes, or the like. A location server may be able to provide a more accurate location based on more advanced or complicated location technologies compared to a location determined by the device itself. To ensure security and privacy associated with a location request, aspects provided herein may encode information for providing the location into a state token in a location request, and the location server may respond with another state token. By way of example, the state token may include a location history, uncertainties, confidence metrics, historical location related measurements associated with the device (which may include measurements made by the network work device or measurements made by other entities based on signals transmitted by the device), state machine values, probabilities, and aggregations of these values, or the like. The state token may be persisted (e.g., stored) at the device (e.g., or a separate device associated with the device that is not located at the device or the location server) but not the location server, enabling location servers based on state tokens that do not include a device identifier associated with the device.

As used herein, the term "location server" may refer to a collection of one or more servers that may collectively receive a location request associated with a device and provide location information associated with the device to the device or a separate device associated with (e.g., that may be in communication with) the device.

As used herein, the term "location request" may refer to a request transmitted from a device (or another device associated with the device) to a location server to request a location associated with the device. The device may transmit the location request to the location server via one or more intermediaries, such as one or more network nodes, another server, or the like. A transmission may be referred to as "transmitted from the device to the location server" if the transmission originates from the device (or another device associated with the device) and eventually arrives at the location server. In some aspects, a location request may include a state token associated with the device.

As used herein, the term "location response" may refer to a response transmitted from a location server to a device (or another device associated with the device) to provide location information associated with the device. The location server may transmit the location response to the device (or another device associated with the device) via one or more intermediaries, such as one or more network nodes, another server, or the like. A transmission may be referred to as "transmitted from the location server for/to the device" if the transmission originates from the location server and eventually arrives at the device (or another device associated with the device). In some aspects, a location response may include a state token associated with the device. In some aspects, the state token may include location information associated with a device.

As used herein, the term "raw location" may refer to the a location (e.g., such as a most accurate location) determined using the most recent collection of observations of sensors or a global navigation satellite system (GNSS) made by the wireless device. As used herein, the term "device history"

may refer to a location history, metrics associated with the location history, sensor data related to the location history, metrics related to the sensor data, speed, movement category (e.g., airplane, vehicle, or sea), confidence score, acceleration, other data generated based on the previously mentioned data, or the like. As used herein, the term "processing algorithm" refers to an algorithm for the purpose of determining an adjusted location based on a raw location. The term "adjusted location" may refer to a determined or calculated location that may or may not equal to a raw location.

As used herein, the term "change of precision" may refer to a ratio of a metric regarding precision of a new location compared with a metric regarding precision of a previous location associated with a same device, the ratio may be referred to as "HPE ratio." The term "smoothed longitude" and "smoothed latitude" may refer to longitude and latitude values generated based on processing longitude and latitude values by using a kinetic motion model or a window based statistical model.

The term "last updated location" may refer to a most recent location (e.g., a most recent previous location some time ago) determined for the device. As used herein, the term "rate of change limit" may refer to a calculated upper limit associated with a rate of change of speed, acceleration, or distance associated with a device that may be used to determine whether a current raw location may be potentially false. As used herein, the term "maximum data size" may refer to an upper limit in a database of a location server or another device that may be allocated to device history of a particular device. For example, to save storage space and decrease processing complexity the location server may not store and utilize all device history associated with a particular device, but rather a device history of a fixed maximum data size so that the storage space and processing complexity would not increase over time. As used herein, the term "device scan" may refer to sensor data associated with a particular device.

As used herein, the term "state token" may refer to a token that includes stateful components of the algorithms used to produce, filter, smooth, debounce, or otherwise adjust a determined location associated with a device. The stateful components may be one or more elements that may include one or more of a last (which may also be referred to as "most recent") location associated with the device, a last serving cell associated with the device, confidence metrics and uncertainties associated with a calculated device location (or associated with the most recent location), the calculated device location, a last location provided by the location server, one or more accumulated measurement of beacon signals that includes one or more previous geo-spatial positioning results, one or more positions determined based on a positioning mechanism (e.g., and associated confidence metrics or uncertainties), a state ID, a weight associated with samples, calculated device locations, the one or more positions, or the like. In some aspects, a state token may not include an identifier that allows the location server to determine multiple location requests or state tokens to be associated with a same device. In other words, a state token may not include a persistent (e.g., an identifier that can be unchanged after a location request) identifier associated with the device (even if the persistent identifier is generated by a network or a server), such as an international mobile equipment identity (IMEI), permanent equipment identifier (PEI), international mobile subscriber identity (IMSI), a permanent identifier associated with the device, a temporary identifier associated with the device generated for a purpose other than the location request (e.g., an identifier generated by a network entity associated with the core network or the serving cell to facilitate wireless communication), a radio network temporary identifier (RNTI), a temporary mobile subscriber identity (TMS), a globally unique temporary identity (GUTI), or the like. In some aspects, a state token may include a state ID uniquely associated with the state token. In some aspects, the state ID may be generated based on the one or more other elements in the state token. A state ID may be a randomly generated single-use value that served as a key into stateful data. The state ID may be encoded and may be used by a location server or a device (or another device associated with the device). A new state ID may be generated for every location request and an old state ID may be configured to be discarded after each use (e.g., discarded by the location server after transmitting a response or deleted by the device upon receiving a new state ID associated with a new state token). A state ID does not allow the location server to associate multiple location requests to a single device due to the state ID changes for every location request. By using a state ID, a location server may temporarily store the state token in the event that a device become offline after transmitting a location request, and the location server may transmit a location response after the device come online. In some aspects, an initial location request (a first-in-time location request during a time period that may be configured by the location server) transmitted from the device to the location server may be based on a null state token. A state token may be referred to as a null state token if it does not include information regarding: a most recent location associated with the device, a most recent serving cell associated with the device, an observation variance associated with the device, a location history associated with the device, one or more uncertainties associated with a calculated location, one or more confidence metrics associated with the calculated location, historical location related measurements associated with the device (which may include measurements made by the network work device or measurements made by other entities based on signals transmitted by the device), and one or more state machine values associated with the device. In some aspects, a state token included in a most recently received location response may be included in a subsequent location request from the device to the location server.

When device scans are processed into raw location results, there may be an innate statistical uncertainty in the result caused by which subset of the potentially observable beacons are seen, the total quantity of beacons observed in a scan, systematic and random error contributing to knowledge of those beacons, and systematic and random error contributing to the final calculated position. To improve accuracy of location estimation, information regarding motion status (e.g., speed, acceleration, or the like), of a device may be used to improve location estimate over multiple samples of raw locations. For example, if a device is known to be stationary, one or more raw locations that scatter around an area associated with that device may be potentially false. In some aspects, if the device is determined to be stationary, such information may be stored in the device history and the information regarding the device being stationary may be used so that historical location related measurements associated with the device may be compared with raw location(s). Device history may also be used to improve accuracy of location estimate by enabling filtering of incorrect raw location samples that may produce flyaway outliers (e.g., outliers that are too far away from a determined location based on a distance threshold or a motion status). Aspects provided herein may enable generation of adjusted location that reduces random error associated with device positioning and mitigate the effects of error in beacon positions. In some aspects, various information may be aggregated processing algorithms, such as precision-contextualized algorithms, may be applied to reduce the random error associated with device positioning and mitigate the effects of error in beacon positions when those error sources are independent. When device state information exists, locations derived from the most recent observations are passed through a stateful adjustments pipeline that uses prior and current information to calculate precision-contextualized ranging and perform a stationary assessment. The results of these calculations along with the raw scan data and the device state information may be fed into a process that selects the appropriate accuracy enhancement algorithm(s).

Figure 5:
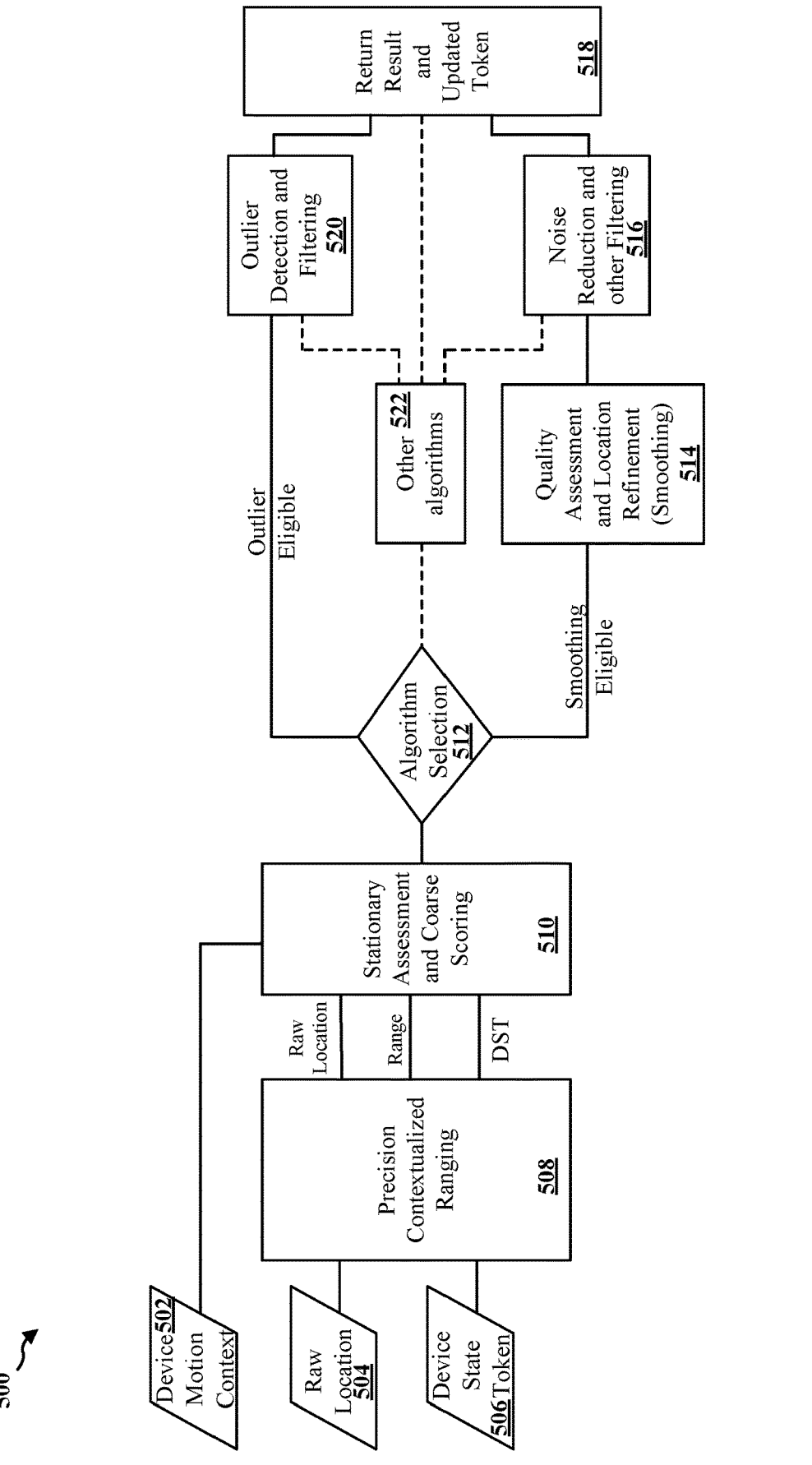
FIG. 5 is a diagram illustrating an example of determining a location based on a raw location based on stateful adjustment.

FIG. 5 is a diagram 500 illustrating an example of determining a location associated with a device based on a raw location based on stateful adjustment. The example of determining a location based on a raw location based on stateful adjustment may be performed by a location server, the device itself, a different server, or the like. As illustrated in FIG. 5, device motion context 502 may be an input for stationary assessment and coarse scoring 510. The device motion context 502 may include speed, acceleration, rate of change associated with the device, speed upper bound or lower bound, acceleration upper bound or lower bound, or other motion related information associated with the device. The raw location 504 may be a raw location based on a sensor scan or a GNSS. The device state token 506 may be a state token associated with a location response. The raw location 504 and the device state token 506 may be used as an input for precision contextualized ranging 508 that evaluates errors associated with the raw location 504 and other information associated with the device state token 506 based on various information that may be included in the device state token 506. In some aspects, the output of the precision contextualized ranging 508 may be used as an input for the stationary assessment and coarse scoring 510. The stationary assessment and coarse scoring 510 may evaluate whether the device may be stationary at a moment and may identify and evaluate coarse score (e.g., a metric used for identifying an outlier) associated with the raw locations. An output of the stationary assessment and coarse scoring 510 may be fed into algorithm selection 512, which may select one or more processing algorithms, such as a smoothing algorithm 514 (which may be accuracy enhancement algorithm) described in connection with FIG. 6, a noise reduction algorithm 516 described in connection with FIG. 7, or an outlier detection and filtering algorithm 520 described in connection with FIG. 8. One or more other algorithms 522 may also be selected or applied. The processing algorithms may be utilized sequentially, in parallel, or in any suitable configuration. The results may be aggregated at 518 and in some aspects, a state token may be generated based on the results. The results may include an adjusted location, one or more metrics associated with the adjusted location, or the like.

Figure 6:
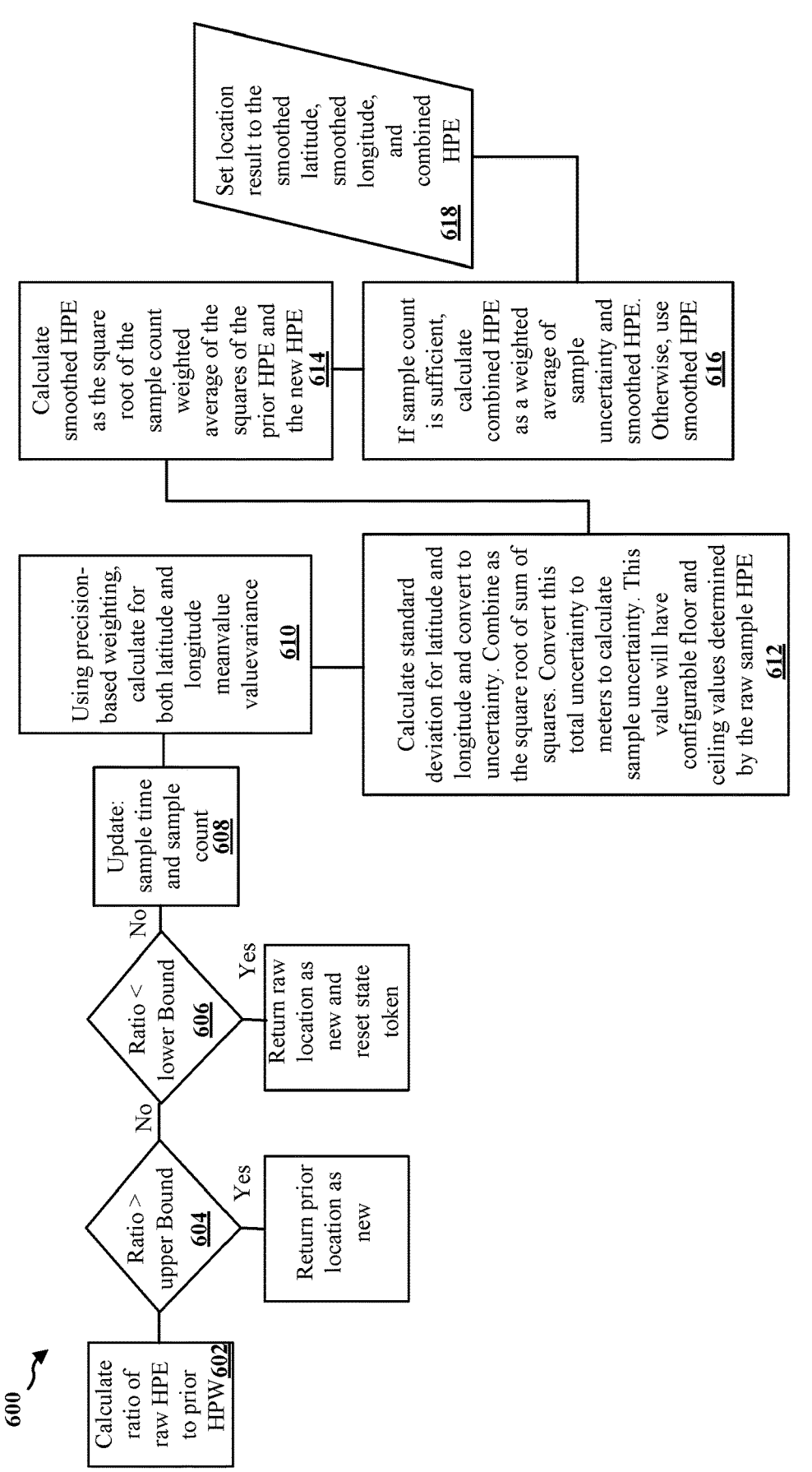
FIG. 6 is a diagram illustrating an example of determining a location based on a raw location based on an accuracy enhancement algorithm.

FIG. 6 is a diagram 600 illustrating an example of determining a location based on a raw location based on an accuracy enhancement algorithm. As illustrated in FIG. 6, at 602, a precision associated with a current raw location may be compared with a precision associated with a previous location (e.g., the most recent or the last updated location). If the ratio of the precision associated with a current raw location and the precision associated with a previous location is higher than an upper bound at 604, meaning that the current raw location is more precise than the previous location by a threshold, the raw location may be determined to be the new location (e.g., the adjusted location) of the device. If the ratio of the precision associated with a current raw location and the precision associated with a previous location is not higher than an upper bound at 604, meaning that the current raw location is not more precise than the previous location by the threshold, the ratio of the precision associated with a current raw location and the precision associated with a previous location may be compared with a lower bound. If the ratio of the precision associated with a current raw location and the precision associated with a previous location is lower than the lower bound at 606, meaning that the current raw location is less precise than the previous location by a threshold, the previous location may be determined as the adjusted location. If the ratio of the precision associated with a current raw location and the precision associated with a previous location is not lower than the lower bound at 606, meaning that the current raw location is not less precise than the previous location by the threshold, sample time and sample count of location information may be updated at 608. Based on the updated sample time and sample count of location information, latitude and longitude mean and variance may be calculated at 610. Standard deviation for latitude and longitude may be calculated and converted to uncertainty at 612. Then the uncertainty may be combined as the square root of sum of squares and may be converted to meters (e.g., distance) to calculate sample uncertainty associated with each sample (e.g., location). The uncertainty may be associated with a configurable floor and ceiling values determined by the precision metric. At 614, smoothed precision as the square root of the sample count weighted average of the squares of the prior precision and the new precision may be calculated. At 616, if sample count is sufficient, combined precision may be calculated as a weighted average of sample uncertainty and smoothed precision. If sample count is not sufficient, smoothed precision may be used. At 618, the adjusted location may be determined to be the smoothed latitude and longitude based on the combined precision. In some aspects, as part of the accuracy enhancement algorithm, if the device is determined to be stationary, the raw location or the adjusted location may be compared with historical locations associated with the device. If the the raw location or the adjusted location is close to the historical locations (e.g., within a distance threshold), the raw location or the adjusted location may be determined to be accurate.

Figure 7:
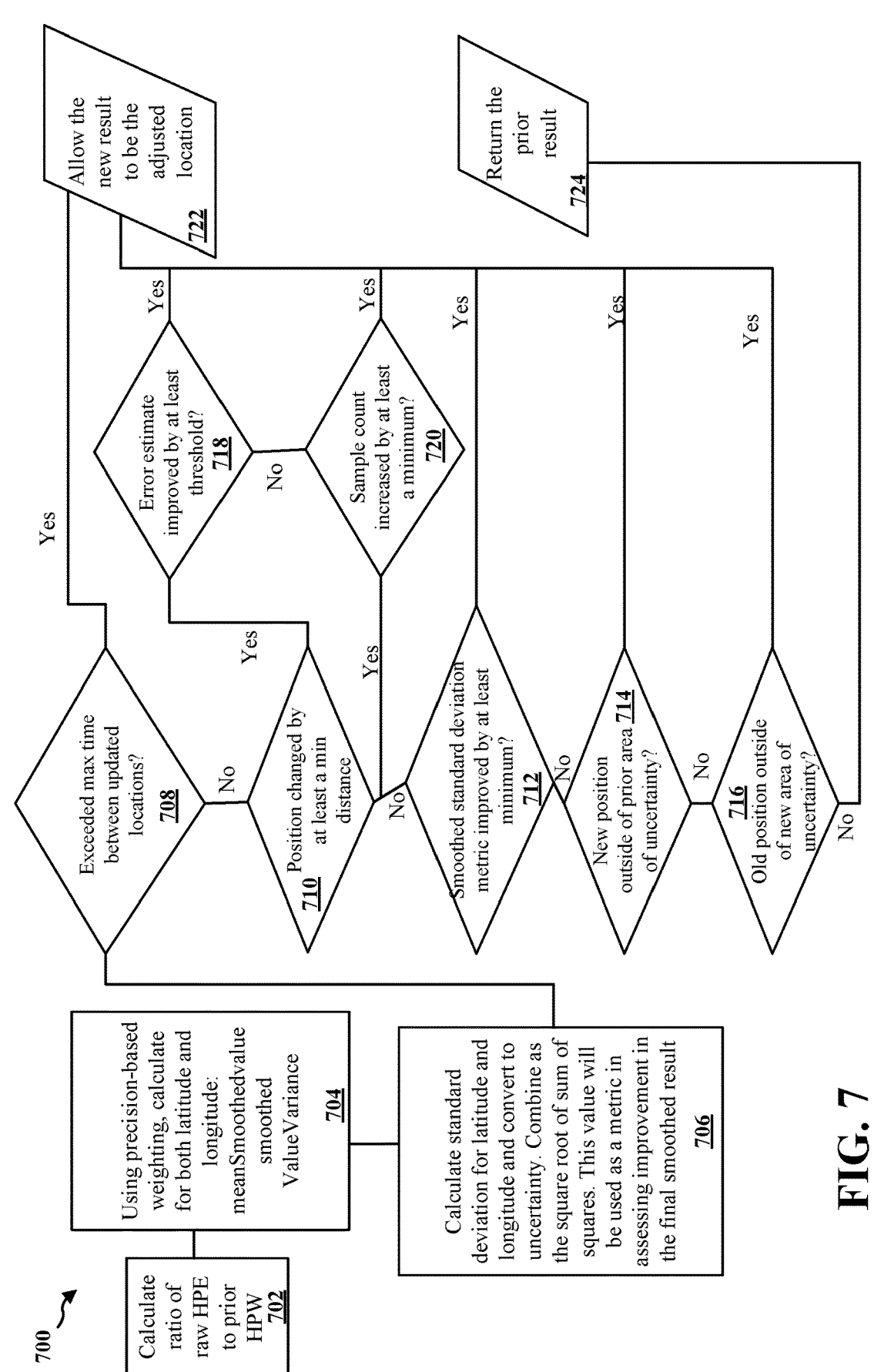
FIG. 7 is a diagram illustrating an example of determining a location based on a raw location based on a noise reduction algorithm.

FIG. 7 is a diagram 700 illustrating an example of determining a location based on a raw location based on a noise reduction algorithm. As illustrated in FIG. 7, at 702, a precision associated with a current raw location may be compared with a precision associated with a previous location (e.g., the most recent or the last updated location). At 704, using precision-based weighting, smoothed mean and variance value for both latitude and longitude may be calculated. At 706, standard deviation for latitude and longitude may be calculated and converted to uncertainty. The uncertainty may be combined as the square root of sum of squares. The combined uncertainty may be used as a metric in assessing improvement in the final smoothed result. At 708, if a time elapsed between a last updated location and the current raw location exceeds a maximum time, the current raw location may be determined to be the adjusted location at 722. Otherwise, at 710, if the position has changed by at least a minimum distance and the error estimate has improved by at least a threshold at 718, the current raw location may be determined to be the adjusted location at 722. If the error estimate has not improved by at least a threshold at 718, if the sample count increased by at least a minimum at 720, the current raw location may be determined to be the adjusted location at 722. In some aspects, if the position has not changed by at least a minimum distance at 710, at 712, if the smoothed standard deviation metric improved by at least minimum, the current raw location may be determined to be the adjusted location at 722. Otherwise, at 714, if the current raw location is outside of a prior area of uncertainty, the current raw location may be determined to be the adjusted location at 722. Otherwise, at 716, if the prior location is outside of a current area of uncertainty, the current raw location may be determined to be the adjusted location at 722. Otherwise, the prior location may be determined to be the adjusted location at 724.

Figure 8:
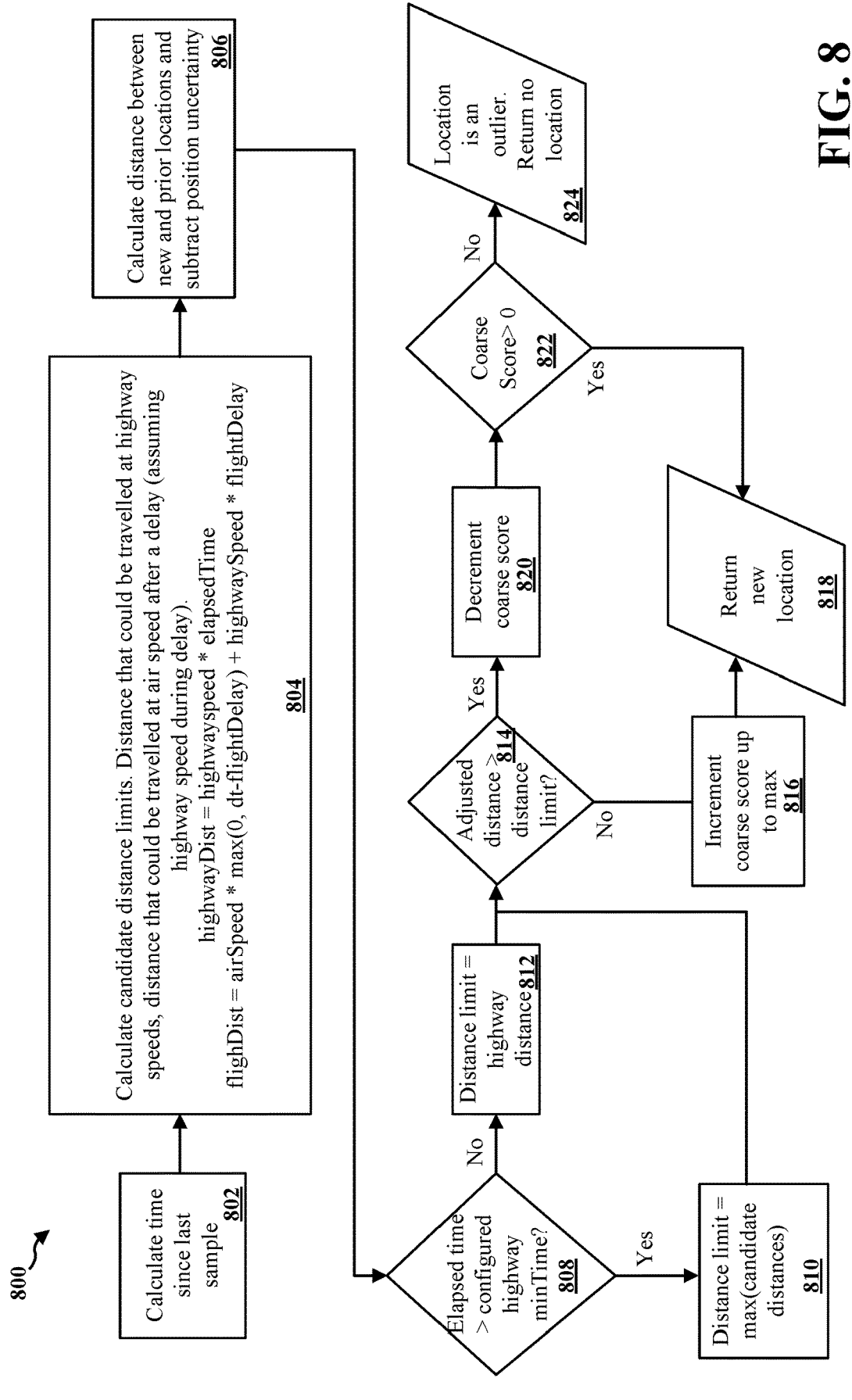
FIG. 8 is a diagram illustrating an example of determining a location based on a raw location based on an outlier filtering algorithm.

FIG. 8 is a diagram 800 illustrating an example of determining a location based on a raw location based on an outlier filtering algorithm. At 802, a time elapsed since last sample may be calculated. At 804, candidate distance limits, such as distance that could be travelled at highway speeds and distance that could be travelled at air speed after a delay may be calculated. At 806, the distance (e.g., actual distance between the current raw location and the prior location or an adjusted distance by subtracting a position uncertainty from the distance) between the current raw location and the prior location may be calculated. At 808, whether the elapsed time is higher than a minimum time may be determined. If the elapsed time is higher than a minimum time, at 810, the distance limit may be set to a higher distance limit among the candidate distance limits. If the elapsed time is not higher than a minimum time, at 812, the distance limit may be set to the highway distance (e.g., distance that could be travelled at highway speeds). At 814, whether a change of distance is higher than the distance limit may be determined. If the change of distance is higher than the distance limit, the coarse score may be decreased at 820. If the change of distance is not higher than the distance limit, the coarse score may be increased to maximum at 816 and the current raw location may be determined to be the adjusted location at 818. After decreasing the coarse score, if the coarse score is greater than zero at 822, the current raw location may be determined to be the adjusted location at 818. Otherwise, the current raw location may be determined as an outlier and may be discarded at 824.

Figure 9:
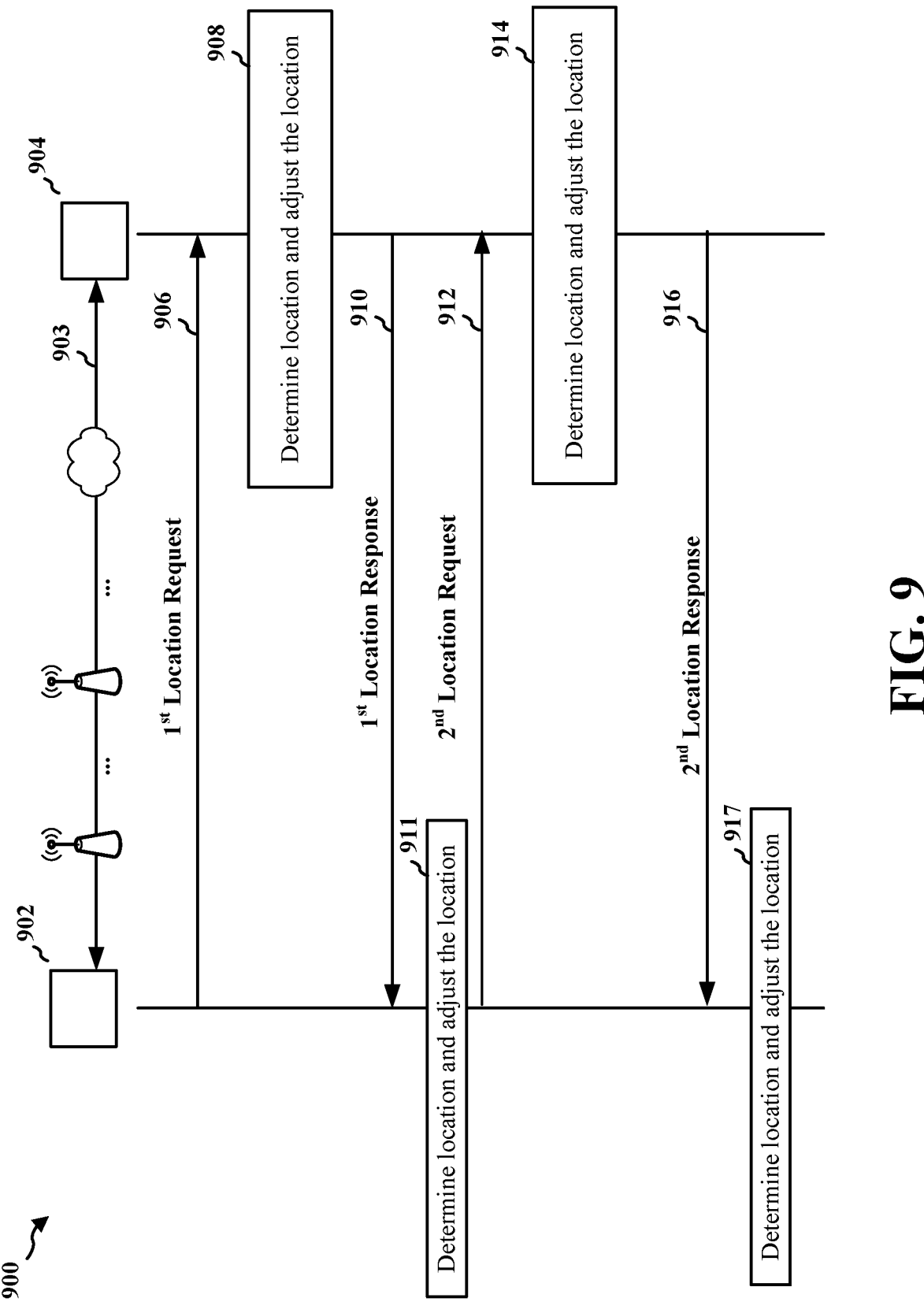
FIG. 9 is a diagram illustrating example communications between a location server and a device.

FIG. 9 is a diagram 900 illustrating example communications between a location server 904 and a device 902. As illustrated in FIG. 9, communications between the location server 904 and the device 902 may be facilitated by connection 903 that may be enabled based on one or more other network nodes, network entities, servers, or the like. Communications between the location server 804 and the device 802 may be based on wireless communication, wired communication, or a mixture of wireless communication and wired communication. As illustrated in FIG. 9, the device 902 may transmit a location request 906 to the location server 904 to request location information associated with the device 902. In some aspects, the location request 906 may include a state token and may not include an identifier that may allow the location server 904 to determine multiple location requests or state tokens to be associated with the same device 902. In some aspects, the location request 906 may be a first location request in a configured period of time. In such aspects, the location request 906 may include a null state token. In some aspects, there may be a prior location request/response during the configured period of time. In such aspects, the location request 906 may include a most recently received state token (e.g., in a prior location response).

In some aspects, as previously described, a state token may include one or more elements associated with a device for the purpose of requesting a location. The one or more elements may include one or more of a last (which may also be referred to as "most recent") location associated with the device, a last serving cell associated with the device, confidence metrics and uncertainties associated with a calculated device location (or associated with the most recent location), the calculated device location, a last location provided by the location server, one or more accumulated measurement of beacon signals that includes one or more previous geo-spatial positioning results, one or more positions determined based on a positioning mechanism (e.g., and associated confidence metrics or uncertainties), a state ID, a weight associated with samples, calculated device locations, the one or more positions, or the like. The state token may not include an identifier that allows the location server 904 to determine multiple location requests or state tokens to be associated with the same device 902.

In some aspects, instead of using a state token, the location request 906 may include a device ID associated with the device 902.

As illustrated in FIG. 9, at 908, after receiving the location request 906, the location server 904 may determine location information associated with the device 902, such as by determining a raw location and then determine an adjusted location based on one or more processing algorithms, such as according to the aspects described in connection with FIGS. 5-8. In some aspects, the location server 904 may generate a second state token and transmit the second state token in a first location response 910 for the device 902. In some aspects, the first state token may include a first state ID and the second state token may include a second state ID. A state ID may be generated by the location server 904 and may be uniquely associated with the state token. In some aspects, the location server 904 may delete a received state token in the location request 906 after generating the state token to be transmitted in the location response 910. In some aspects, upon receiving the location response 910 and the second state token, the device 902 (or a device associated with the device 902) may store the second state token. In some aspects, instead of using a state token, the location response 910 may include a device ID associated with the device 902.

In some aspects, at some time after receiving the location response 910, the device 902 may transmit a second location request 912 to request updated location information associated with the device 902. In some aspects, the second location request 912 may include the second state token that was previously included in the location response 910 and stored by the device 902. In some aspects, the second location request 912 may also include the second state ID because the second state token includes the second state ID. In some aspects, instead of using a state token, the location request 912 may include a device ID associated with the device 902.

In some aspects, upon receiving the second location request 912, the location server 904 may again determine location information associated with the device 902 at 914, such as by determining a raw location and then determine an adjusted location based on one or more processing algorithms, such as according to the aspects described in connection with FIGS. 5-8. In some aspects, the location server 904 may generate a third state token. In some aspects, the location server 904 may delete the second state token upon generating the third state token and may transmit a location response 916 for the device 902 that includes the third state token. In some aspects, instead of using a state token, the location response 916 may include a device ID associated with the device 902.

In some aspects, instead of receiving an adjusted location in the location response 910 or the location response 916, the device 902 may receive a raw location in the location response 910 or the location response 916. In such aspects, the device 902 may determine the adjusted location at 911 or 917 based on the raw location and based on one or more processing algorithms, such as according to the aspects described in connection with FIGS. 5-8.

Figure 10:
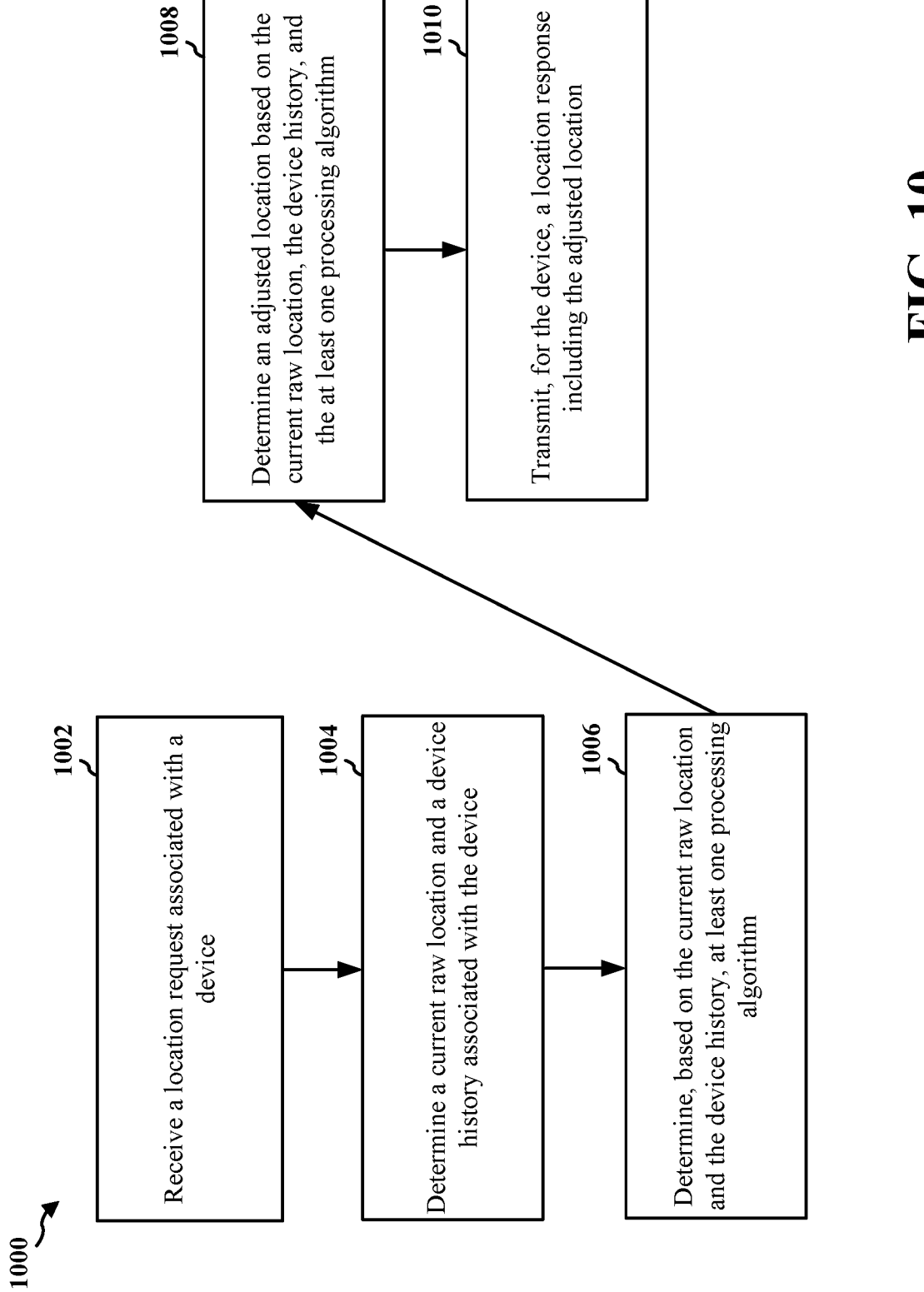
FIG. 10 is a flowchart of a method of providing location information.

FIG. 10 is a flowchart 1000 of a method of providing location information. The method may be performed by a location server (e.g., a location server in communication with the base station 102, the network entity 1202, or the network entity 1302, the location server described in connection with FIG. 5, or the location server 904).

At 1002, the location server may receive a location request associated with a device. For example, the location server 904 may receive a location request 906 associated with a device 902. In some aspects, 1002 may be performed by location component 199.

At 1004, the location server may determine a current raw location and a device history associated with the device. For example, the location server 904 may determine a current raw location and a device history associated with the device at 908. In some aspects, 1004 may be performed by location component 199.

At 1006, the location server may determine, based on the current raw location and the device history, at least one processing algorithm. For example, the location server 904 may determine, based on the current raw location and the device history, at least one processing algorithm at 908. In some aspects, 1006 may be performed by location component 199.

At 1008, the location server may determine an adjusted location based on the current raw location, the device history, and the at least one processing algorithm. For example, the location server 904 may determine an adjusted location based on the current raw location, the device history, and the at least one processing algorithm at 908. In some aspects, 1008 may be performed by location component 199.

In some aspects, the at least one processing algorithm includes an accuracy enhancement algorithm, and the location server may determine whether a change of precision associated with a comparison of the current raw location and a last updated location exceeds an upper bound or a lower bound. The location server may, when the change of precision exceeds the upper bound, determine the adjusted location to be equal to the last updated location. The location server may, when the change of precision exceeds the lower bound, determine the adjusted location to be equal to the current raw location. The location server may, when the change of precision does not exceed the upper bound or the lower bound, calculate a smoothed latitude and a smoothed longitude and determine the adjusted location based on the smoothed latitude and the smoothed longitude.

In some aspects, the at least one processing algorithm includes a noise reduction algorithm. In some aspects, the location server may calculate a smoothed latitude and a smoothed longitude and determine the adjusted location based on the smoothed latitude and the smoothed longitude based on at least one of: a time elapsed between the current raw location and a last updated location exceeds a time threshold, a distance between the current raw location and the last updated location exceeds a distance threshold, the current raw location is outside of a prior area of uncertainty, the last updated location is outside of a current area of uncertainty, or a change of standard deviation associated with the smoothed latitude and the smoothed longitude being higher than a standard deviation threshold.

In some aspects, the at least one processing algorithm includes an outlier filtering algorithm. In some aspects, the location server may calculate at least one rate of change limit associated with the current raw location and a last updated location. In some aspects, the location server may determine the adjusted location to be equal to the current raw location based on at least one rate of change associated with the current raw location and the last updated location being smaller than the at least one rate of change limit. In some aspects, the location server may determine the adjusted location to be equal to the last updated location based on the at least one rate of change associated with the current raw location and the last updated location being larger than the at least one rate of change limit.

At 1010, the location server may transmit, for the device, a location response including the adjusted location. For example, the location server 904 may transmit, for the device 902, a location response 910 including the adjusted location. In some aspects, 1010 may be performed by location component 199.

In some aspects, the location server may receive a second location request associated with the device. In some aspects, the location server may determine a second current raw location and a second device history associated with the device. In some aspects, the location server may determine, based on the second current raw location and the second device history, at least one second processing algorithm, where the second device history and the device history are associated with a same maximum data size. In some aspects, the location server may determine a second adjusted location based on the second current raw location, the second device history, and the at least one second processing algorithm. In some aspects, the location server may transmit, for the device, a second location response including the second adjusted location.

In some aspects, the first state token includes information regarding one or more of: a most recent location associated with the device, a most recent serving cell associated with the device, an observation variance associated with the device, a location history associated with the device, one or more uncertainties associated with a calculated location, one or more confidence metrics associated with the calculated location, historical location related measurements associated with the device (which may include measurements made by the network work device or measurements made by other entities based on signals transmitted by the device), or one or more state machine values associated with the device. In some aspects, the first state token includes a state ID, and where the state ID is based on a prior location response before the location response. In some aspects, the identifier is a value that allows the location server to identify and associate more than one location requests with the device. In other words, the location request may not include a value that allows the location server to identify and associate more than one location requests with the device. In some aspects, the first state token does not include information regarding: a most recent location associated with the device, a most recent serving cell associated with the device, an observation variance associated with the device, a location history associated with the device, one or more uncertainties associated with a calculated location, one or more confidence metrics associated with the calculated location, historical scan data associated with the device, or one or more state machine values associated with the device. A state token that does not include such information may be a null token. For example, during if the location request is a first-ever location request to the location server, the first state token may be a null token.

In some aspects, the location server may generate the second state token including a second state ID, maintain the second state ID and the second state token before transmission of the location response, and delete the first state ID after generation of the second state ID. In some aspects, such as in aspects where the device may be offline, the location server may store the second state token and the second state ID for a period of time until the device come online.

Figure 11:
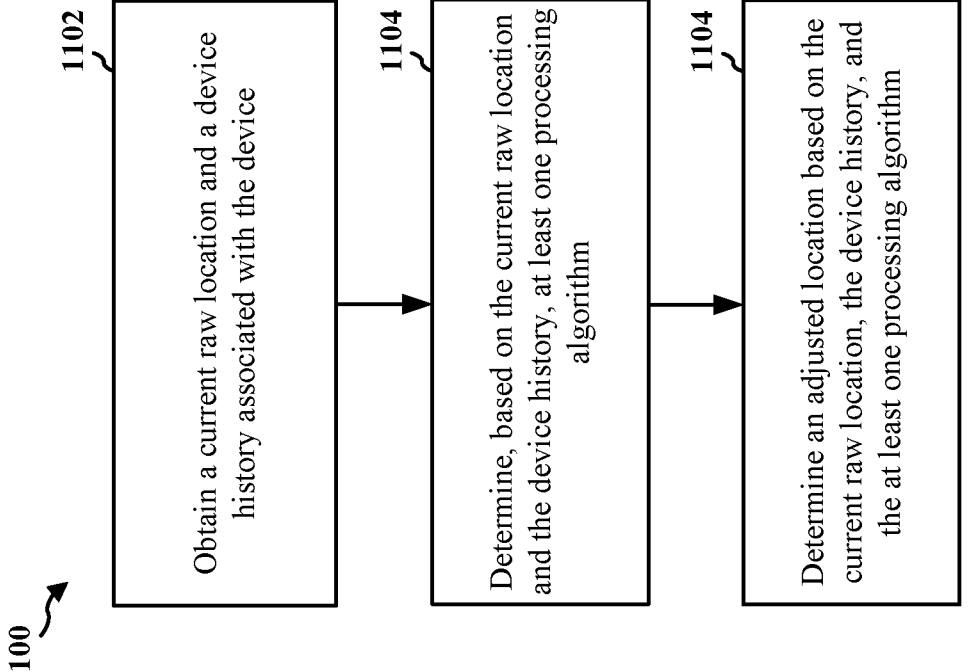
FIG. 11 is a flowchart of a method of determining a location.

FIG. 11 is a flowchart 1100 of a method of determining a location. The method may be performed by a device (e.g., the UE 104, described in connection with FIG. 5, the device 902; the apparatus 1204).

At 1102, the device may obtain a current raw location and a device history associated with the device. For example, the device 902 may obtain a current raw location and a device history associated with the device based on the first location response 910 or a different source. In some aspects, 1002 may be performed by location component 199. In some aspects, to obtain the current raw location the device may transmit, to a server, a location request for the current raw location and receive, from the server based on the location request, the current raw location. In some aspects, to obtain the current raw location the device may determine, based on a global navigation satellite system (GNSS) or a sensor, the current raw location.

At 1104, the device may determine, based on the current raw location and the device history, at least one processing algorithm. For example, the device 902 may determine, at 911, based on the current raw location and the device history, at least one processing algorithm. In some aspects, 1004 may be performed by location component 199.

At 1106, the device may determine an adjusted location based on the current raw location, the device history, and the at least one processing algorithm. For example, the device 902 may, at 911, determine an adjusted location based on the current raw location, the device history, and the at least one processing algorithm. In some aspects, 1006 may be performed by location component 199. In some aspects, the device may cause a screen associated with the device to render the adjusted location.

In some aspects, the at least one processing algorithm includes an accuracy enhancement algorithm, and the device may determine whether a change of precision associated with a comparison of the current raw location and a last updated location exceeds an upper bound or a lower bound. The device may, when the change of precision exceeds the upper bound, determine the adjusted location to be equal to the last updated location. The device may, when the change of precision exceeds the lower bound, determine the adjusted location to be equal to the current raw location. The device may, when the change of precision does not exceed the upper bound or the lower bound, calculate a smoothed latitude and a smoothed longitude and determine the adjusted location based on the smoothed latitude and the smoothed longitude.

In some aspects, the at least one processing algorithm includes a noise reduction algorithm. In some aspects, the device may calculate a smoothed latitude and a smoothed longitude and determine the adjusted location based on the smoothed latitude and the smoothed longitude based on at least one of: a time elapsed between the current raw location and a last updated location exceeds a time threshold, a distance between the current raw location and the last updated location exceeds a distance threshold, the current raw location is outside of a prior area of uncertainty, the last updated location is outside of a current area of uncertainty, or a change of standard deviation associated with the smoothed latitude and the smoothed longitude being higher than a standard deviation threshold.

In some aspects, the at least one processing algorithm includes an outlier filtering algorithm. In some aspects, the device may calculate at least one rate of change limit associated with the current raw location and a last updated location. In some aspects, the device may determine the adjusted location to be equal to the current raw location based on at least one rate of change associated with the current raw location and the last updated location being smaller than the at least one rate of change limit. In some aspects, the device may determine the adjusted location to be equal to the last updated location based on the at least one rate of change associated with the current raw location and the last updated location being larger than the at least one rate of change limit.

Figure 12:
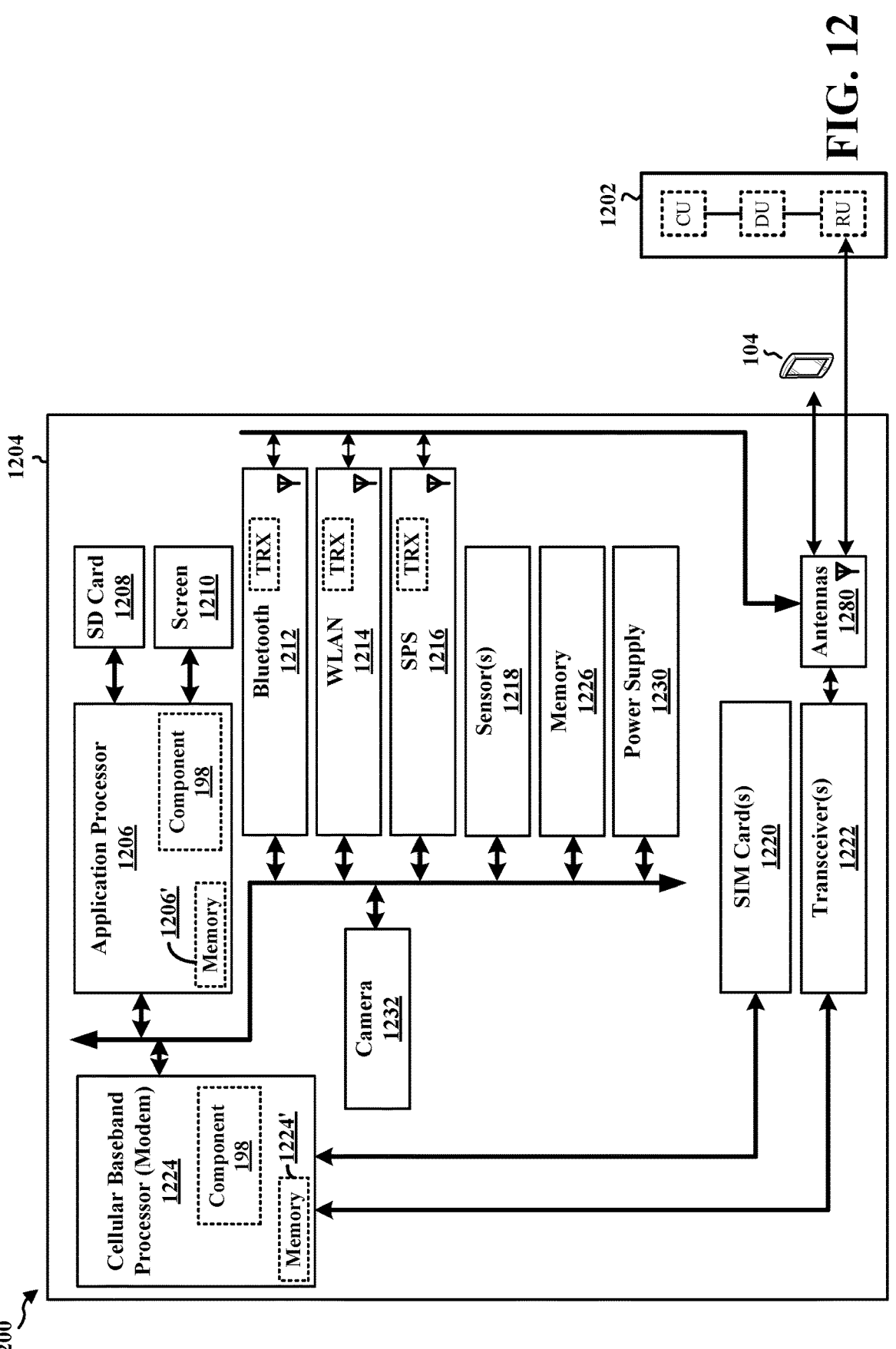
FIG. 12 is a diagram illustrating an example of a hardware implementation for an example apparatus and/or network entity.

In some aspects, the device may determine a second current raw location and a second device history associated with the device. In some aspects, the device may determine, based on the second current raw location and the second device history, at least one second processing algorithm, where the second device history and the device history are associated with a same maximum data size. In some aspects, the device may determine a second adjusted location based on the second current raw location, the second device history, and the at least one second processing algorithm FIG. 12 is a diagram 1200 illustrating an example of a hardware implementation for an apparatus 1204. The apparatus 1204 may be a UE, a component of a UE, or may implement UE functionality. In some aspects, the apparatus 1204 may include at least one cellular baseband processor 1224 (also referred to as a modem) coupled to one or more transceivers 1222 (e.g., cellular RF transceiver). The cellular baseband processor(s) 1224 may include at least one on-chip memory 1224'. In some aspects, the apparatus 1204 may further include one or more subscriber identity modules (SIM) cards 1220 and at least one application processor 1206 coupled to a secure digital (SD) card 1208 and a screen 1210. The application processor(s) 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor(s) 1224 communicates through the transceiver(s) 1222 via one or more antennas 1280 with the UE 104 and/or with an RU associated with a network entity 1202. The cellular baseband processor(s) 1224 and the application processor(s) 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor(s) 1224 and the application processor(s) 1206 are each responsible for general processing, including the execution of software stored on the computer-readable medium/memory. The software, when executed by the cellular baseband processor(s) 1224/application processor(s) 1206, causes the cellular baseband processor(s) 1224/application processor(s) 1206 to perform the various functions described supra. The computer-readable medium/memory may also be used for storing data that is manipulated by the cellular baseband processor(s) 1224/application processor(s) 1206 when executing software. The cellular baseband processor(s) 1224/application processor(s) 1206 may be a component of the UE 350 and may include the at least one memory 360 and/or at least one of the TX processor 368, the RX processor 356, and the controller/processor 359. In one configuration, the apparatus 1204 may be at least one processor chip (modem and/or application) and include just the cellular baseband processor(s) 1224 and/or the application processor(s) 1206, and in another configuration, the apparatus 1204 may be the entire UE (e.g., see UE 350 of FIG. 3) and include the additional modules of the apparatus 1204.

As discussed supra, the location component 198 may be configured to obtain a current raw location and a device history associated with the device. In some aspects, the location component 198 may be configured to determine, based on the current raw location and the device history, at least one processing algorithm. In some aspects, the location component 198 may be configured to determine an adjusted location based on the current raw location, the device history, and the at least one processing algorithm. The location component 198 may be within the cellular baseband processor(s) 1224, the application processor(s) 1206, or both the cellular baseband processor(s) 1224 and the application processor(s) 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1204 may include a variety of components configured for various functions. In one configuration, the apparatus 1204, and in particular the cellular baseband processor(s) 1224 and/or the application processor(s) 1206, may include means for obtaining a current raw location and a device history associated with the device. In some aspects, the apparatus 1204 may include means for determining, based on the current raw location and the device history, at least one processing algorithm. In some aspects, the apparatus 1204 may include means for determining an adjusted location based on the current raw location, the device history, and the at least one processing algorithm. In some aspects, the apparatus 1204 may include means for transmitting, to a server, a location request for the current raw location. In some aspects, the apparatus 1204 may include means for receiving, from the server based on the location request, the current raw location. In some aspects, the apparatus 1204 may include means for determining, based on a global navigation satellite system (GNSS) or a sensor, the current raw location. In some aspects, the apparatus 1204 may include means for determining whether a change of precision associated with a comparison of the current raw location and a last updated location exceeds an upper bound or a lower bound. In some aspects, the apparatus 1204 may include means for when the change of precision exceeds the upper bound, determining the adjusted location to be equal to the last updated location. In some aspects, the apparatus 1204 may include means for when the change of precision exceeds the lower bound, determining the adjusted location to be equal to the current raw location. In some aspects, the apparatus 1204 may include means for when the change of precision does not exceed the upper bound or the lower bound, calculating a smoothed latitude and a smoothed longitude and determine the adjusted location based on the smoothed latitude and the smoothed longitude. In some aspects, the apparatus 1204 may include means for calculating a smoothed latitude and a smoothed longitude. In some aspects, the apparatus 1204 may include means for determining the adjusted location based on the smoothed latitude and the smoothed longitude based on at least one of: a time elapsed between the current raw location and a last updated location exceeds a time threshold, a distance between the current raw location and the last updated location exceeds a distance threshold, the current raw location is outside of a prior area of uncertainty, the last updated location is outside of a current area of uncertainty, or a change of standard deviation associated with the smoothed latitude and the smoothed longitude being higher than a standard deviation threshold. In some aspects, the apparatus 1204 may include means for calculating at least one rate of change limit associated with the current raw location and a last updated location. In some aspects, the apparatus 1204 may include means for determining the adjusted location to be equal to the current raw location based on at least one rate of change associated with the current raw location and the last updated location being smaller than the at least one rate of change limit. In some aspects, the apparatus 1204 may include means for determining the adjusted location to be equal to the last updated location based on the at least one rate of change associated with the current raw location and the last updated location being larger than the at least one rate of change limit. In some aspects, the apparatus 1204 may include means for determining a second current raw location and a second device history associated with the device. In some aspects, the apparatus 1204 may include means for determining, based on the second current raw location and the second device history, at least one second processing algorithm, where the second device history and the device history are associated with a same maximum data size. In some aspects, the apparatus 1204 may include means for determining a second adjusted location based on the second current raw location, the second device history, and the at least one second processing algorithm. The means may be the component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
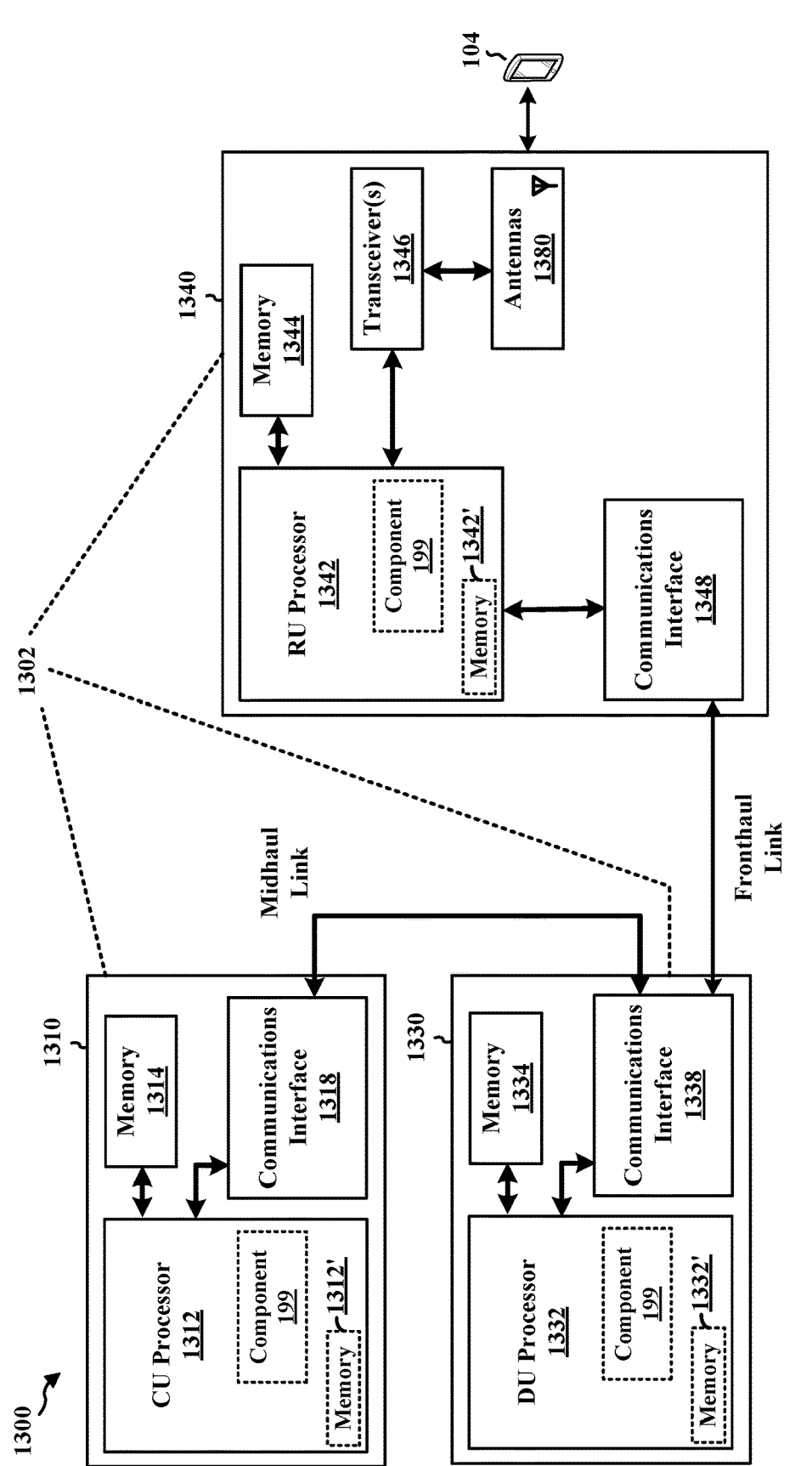
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include at least one CU processor 1312. The CU processor(s) 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include at least one DU processor 1332. The DU processor(s) 1332 may include on-chip memory 1332'. In some aspects, the DU 1330 may further include additional memory modules 1334 and a communications interface 1338. The DU 1330 communicates with the RU 1340 through a fronthaul link. The RU 1340 may include at least one RU processor 1342. The RU processor(s) 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/ memory may also be used for storing data that is manipulated by the processor(s) when executing software.

As discussed supra, the location component 199 may be configured to receive a location request associated with a device. In some aspects, the location component 199 may be further configured to determine a current raw location and a device history associated with the device. In some aspects, the location component 199 may be further configured to determine, based on the current raw location and the device history, at least one processing algorithm. In some aspects, the location component 199 may be further configured to determine an adjusted location based on the current raw location, the device history, and the at least one processing algorithm. In some aspects, the location component 199 may be further configured to transmit, for the device, a location response including the adjusted location. The location component 199 may be within one or more processors of one or more of the CU 1310, DU 1330, and the RU 1340. The component 199 may be one or more hardware components specifically configured to carry out the stated processes/ algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1302 may include a variety of components configured for various functions. In one configuration, the network entity 1302 may include means for receiving a location request associated with a device. In some aspects, the network entity 1302 may include means for determining a current raw location and a device history associated with the device. In some aspects, the network entity 1302 may include means for determining, based on the current raw location and the device history, at least one processing algorithm. In some aspects, the network entity 1302 may include means for determining an adjusted location based on the current raw location, the device history, and the at least one processing algorithm. In some aspects, the network entity 1302 may include means for transmitting, for the device, a location response including the adjusted location. In some aspects, the network entity 1302 may include means for determining whether a change of precision associated with a comparison of the current raw location and a last updated location exceeds an upper bound or a lower bound. In some aspects, the network entity 1302 may include means for when the change of precision exceeds the upper bound, determining the adjusted location to be equal to the last updated location. In some aspects, the network entity 1302 may include means for when the change of precision exceeds the lower bound, determining the adjusted location to be equal to the current raw location. In some aspects, the network entity 1302 may include means for when the change of precision does not exceed the upper bound or the lower bound, calculating a smoothed latitude and a smoothed longitude and determine the adjusted location based on the smoothed latitude and the smoothed longitude. In some aspects, the network entity 1302 may include means for calculating a smoothed latitude and a smoothed longitude. In some aspects, the network entity 1302 may include means for determining the adjusted location based on the smoothed latitude and the smoothed longitude based on at least one of: a time elapsed between the current raw location and a last updated location exceeds a time threshold, a distance between the current raw location and the last updated location exceeds a distance threshold, the current raw location is outside of a prior area of uncertainty, the last updated location is outside of a current area of uncertainty, or a change of standard deviation associated with the smoothed latitude and the smoothed longitude being higher than a standard deviation threshold. In some aspects, the network entity 1302 may include means for calculating at least one rate of change limit associated with the current raw location and a last updated location. In some aspects, the network entity 1302 may include means for determining the adjusted location to be equal to the current raw location based on at least one rate of change associated with the current raw location and the last updated location being smaller than the at least one rate of change limit. In some aspects, the network entity 1302 may include means for determining the adjusted location to be equal to the last updated location based on the at least one rate of change associated with the current raw location and the last updated location being larger than the at least one rate of change limit. In some aspects, the network entity 1302 may include means for receiving a second location request associated with the device. In some aspects, the network entity 1302 may include means for determining a second current raw location and a second device history associated with the device. In some aspects, the network entity 1302 may include means for determining, based on the second current raw location and the second device history, at least one second processing algorithm, where the second device history and the device history are associated with a same maximum data size. In some aspects, the network entity 1302 may include means for determining a second adjusted location based on the second current raw location, the second device history, and the at least one second processing algorithm. In some aspects, the network entity 1302 may include means for transmitting, for the device, a second location response including the second adjusted location.

The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method performed by a location server, including: receiving a location request associated with a device; determining a current raw location and a device history associated with the device; determining, based on the current raw location and the device history, at least one processing algorithm; determining an adjusted location based on the current raw location, the device history, and the at least one processing algorithm; and transmitting, for the device, a location response including the adjusted location.

Aspect 2 is the method of aspect 1, where the at least one processing algorithm includes an accuracy enhancement algorithm, and where determining the adjusted location includes: determining whether a change of precision associated with a comparison of the current raw location and a last updated location exceeds an upper bound or a lower bound; and determining, based on the change of precision exceeding the upper bound, the adjusted location to be equal to the last updated location; determining, based on the change of precision exceeding the lower bound, the adjusted location to be equal to the current raw location; or calculating, based on the change of precision not exceeding the upper bound or the lower bound, a smoothed latitude and a smoothed longitude and determine the adjusted location based on the smoothed latitude and the smoothed longitude.

Aspect 3 is the method of any of aspects 1-2, where the at least one processing algorithm includes a noise reduction algorithm, and where determining the adjusted location includes: calculating a smoothed latitude and a smoothed longitude; and determining the adjusted location based on the smoothed latitude and the smoothed longitude based on at least one of: a time elapsed between the current raw location and a last updated location exceeds a time threshold, a distance between the current raw location and the last updated location exceeds a distance threshold, the current raw location is outside of a prior area of uncertainty, the last updated location is outside of a current area of uncertainty, or a change of standard deviation associated with the smoothed latitude and the smoothed longitude being higher than a standard deviation threshold.

Aspect 4 is the method of any of aspects 1-3, where the at least one processing algorithm includes an outlier filtering algorithm, and where determining the adjusted location includes: calculating at least one rate of change limit associated with the current raw location and a last updated location; determining the adjusted location to be equal to the current raw location based on at least one rate of change associated with the current raw location and the last updated location being smaller than the at least one rate of change limit; or determining the adjusted location to be equal to the last updated location based on the at least one rate of change associated with the current raw location and the last updated location being larger than the at least one rate of change limit.

Aspect 5 is the method of any of aspects 1-4, further including: receiving a second location request associated with the device; determining a second current raw location and a second device history associated with the device; determining, based on the second current raw location and the second device history, at least one second processing algorithm, where the second device history and the device history are associated with a same maximum data size; determining a second adjusted location based on the second current raw location, the second device history, and the at least one second processing algorithm; and transmitting, for the device, a second location response including the second adjusted location.

Aspect 6 is the method of any of aspects 1-5, where the location request includes a first state token and the adjusted location is included in a second state token.

Aspect 7 is the method of aspect 6, where the first state token includes information regarding one or more of: a most recent location associated with the device, a most recent serving cell associated with the device, an observation variance associated with the device, a location history associated with the device, one or more uncertainties associated with a calculated location, one or more confidence metrics associated with the device, historical scan data associated with the device, or one or more state machine values associated with the device.

Aspect 8 is the method of any of aspects 6-7, where the second state token includes information regarding one or more of: a most recent location associated with the device, a most recent serving cell associated with the device, an observation variance associated with the device, a location history associated with the device, one or more uncertainties associated with a calculated location, one or more confidence metrics associated with the device, historical location related measurements associated with the device, or one or more state machine values associated with the device.

Aspect 9 is the method of any of aspects 6-8, where the first state token includes a state identifier (ID), and where the state ID is based on a prior location response before the location response.

Aspect 10 is the method of aspect 9, further including: generating the second state token including a second state ID; maintaining the second state ID and the second state token before transmission of the location response; and deleting the state ID after generation of the second state ID.

Aspect 11 is a method performed by an apparatus associated with a device, including: obtaining a current raw location and a device history associated with the device; determining, based on the current raw location and the device history, at least one processing algorithm; and determining an adjusted location based on the current raw location, the device history, and the at least one processing algorithm.

Aspect 12 is the method of aspect 11, where obtaining the current raw location further includes: transmitting, to a server, a location request for the current raw location; and receiving, from the server based on the location request, the current raw location.

Aspect 13 is the method of aspect 11, where obtaining the current raw location further includes: determining, based on a global navigation satellite system (GNSS) or a sensor, the current raw location.

Aspect 14 is the method of any of aspects 11-13, where the at least one processing algorithm includes an accuracy enhancement algorithm, and where determining the adjusted location includes: determining whether a change of precision associated with a comparison of the current raw location and a last updated location exceeds an upper bound or a lower bound; and determining, based on the change of precision exceeding the upper bound, the adjusted location to be equal to the last updated location; determining, based on the change of precision exceeding the lower bound, the adjusted location to be equal to the current raw location; or calculating, based on the change of precision not exceeding the upper bound or the lower bound, a smoothed latitude and a smoothed longitude and determine the adjusted location based on the smoothed latitude and the smoothed longitude.

Aspect 15 is the method of any of aspects 11-14, where the at least one processing algorithm includes a noise reduction algorithm, and where determining the adjusted location includes: calculating a smoothed latitude and a smoothed longitude; and determining the adjusted location based on the smoothed latitude and the smoothed longitude based on at least one of: a time elapsed between the current raw location and a last updated location exceeds a time threshold, a distance between the current raw location and the last updated location exceeds a distance threshold, the current raw location is outside of a prior area of uncertainty, the last updated location is outside of a current area of uncertainty, or a change of standard deviation associated with the smoothed latitude and the smoothed longitude being higher than a standard deviation threshold.

Aspect 16 is the method of any of aspects 11-15, where the at least one processing algorithm includes an outlier filtering algorithm, and where determining the adjusted location includes: calculating at least one rate of change limit associated with the current raw location and a last updated location; determining the adjusted location to be equal to the current raw location based on at least one rate of change associated with the current raw location and the last updated location being smaller than the at least one rate of change limit; or determining the adjusted location to be equal to the last updated location based on the at least one rate of change associated with the current raw location and the last updated location being larger than the at least one rate of change limit.

Aspect 17 is the method of any of aspects 11-16, further including: determining a second current raw location and a second device history associated with the device; determining, based on the second current raw location and the second device history, at least one second processing algorithm, where the second device history and the device history are associated with a same maximum data size; and determining a second adjusted location based on the second current raw location, the second device history, and the at least one second processing algorithm.

Aspect 18 is the method of any of aspects 11-17, further including: causing a screen associated with the device to render the adjusted location.

Aspect 19 is an apparatus at a device including at least one memory and at least one processor coupled to the at least one memory and, the at least one processor, individually or in any combination, based at least in part on information stored in the at least one memory, the at least one processor is configured to implement any of aspects 1 to 10.

Aspect 20 is the apparatus of aspect 19, further including one or more transceivers or one or more antennas coupled to the at least one processor.

Aspect 21 is an apparatus at a device including means for implementing any of aspects 1 to 10.

Aspect 22 is a computer-readable medium (e.g., a non-transitory computer-readable medium) storing computer executable code, where the code when executed by at least one processor causes the at least one processor to implement any of aspects 1 to 10.

Aspect 23 is an apparatus at a device including at least one memory and at least one processor coupled to the at least one memory and, the at least one processor, individually or in any combination, based at least in part on information stored in the at least one memory, the at least one processor is configured to implement any of aspects 11 to 18.

Aspect 24 is the apparatus of aspect 23, further including one or more transceivers or one or more antennas coupled to the at least one processor.

Aspect 25 is an apparatus at a device including means for implementing any of aspects 11 to 18.

Aspect 26 is a computer-readable medium (e.g., a non-transitory computer-readable medium) storing computer executable code, where the code when executed by at least one processor causes the at least one processor to implement any of aspects 11 to 18.

What is claimed is:

1. An apparatus at a location server, comprising:
at least one memory; and
at least one processor coupled to the at least one memory and, based at least in part on information stored in the at least one memory, the at least one processor is configured to:
  receive a location request associated with a device;
  determine a current raw location and a device history associated with the device;
  determine, based on the current raw location and the device history, at least one processing algorithm;
  calculate a smoothed latitude and a smoothed longitude;
  determine an adjusted location based on the current raw location, the device history, and the at least one processing algorithm, wherein the adjusted location is further based on the smoothed latitude and the smoothed longitude and at least one of: a time elapsed between the current raw location and a last updated location exceeds a time threshold, a distance between the current raw location and the last updated location exceeds a distance threshold, the current raw location is outside of a prior area of uncertainty, the last updated location is outside of a current area of uncertainty, or a change of standard deviation associated with the smoothed latitude and the smoothed longitude being higher than a standard deviation threshold; and
  transmit, for the device, a location response including the adjusted location.

2. The apparatus of claim 1, wherein the at least one processing algorithm comprises an accuracy enhancement algorithm, and wherein to determine the adjusted location, the at least one processor is configured to:
  determine whether a change of precision associated with a comparison of the current raw location and the last updated location exceeds an upper bound or a lower bound; and determine, based on the change of precision exceeding the upper bound, the adjusted location to be equal to the last updated location;
determine, based on the change of precision exceeding the lower bound, the adjusted location to be equal to the current raw location; or
calculate, based on the change of precision not exceeding the upper bound or the lower bound, the smoothed latitude and the smoothed longitude and determine the adjusted location based on the smoothed latitude and the smoothed longitude.

3. The apparatus of claim 1, wherein the at least one processing algorithm comprises a noise reduction algorithm.

4. The apparatus of claim 1, wherein the at least one processing algorithm comprises an outlier filtering algorithm, and wherein to determine the adjusted location, the at least one processor is configured to:
  calculate at least one rate of change limit associated with the current raw location and the last updated location;
  determine the adjusted location to be equal to the current raw location based on the at least one rate of change associated with the current raw location and the last updated location being smaller than the at least one rate of change limit; or
  determine the adjusted location to be equal to the last updated location based on the at least one rate of change associated with the current raw location and the last updated location being larger than the at least one rate of change limit.

5. The apparatus of claim 1, wherein the at least one processor is further configured to:
  receive a second location request associated with the device;
  determine a second current raw location and a second device history associated with the device;
  determine, based on the second current raw location and the second device history, at least one second processing algorithm, wherein the second device history and the device history are associated with a same maximum data size;
  determine a second adjusted location based on the second current raw location, the second device history, and the at least one second processing algorithm; and
  transmit, for the device, a second location response including the second adjusted location.

6. The apparatus of claim 1, wherein the location request comprises a first state token and the adjusted location is included in a second state token.

7. The apparatus of claim 6, wherein the first state token comprises information regarding one or more of: a most recent location associated with the device, a most recent serving cell associated with the device, an observation variance associated with the device, a location history associated with the device, one or more uncertainties associated with a calculated location, one or more confidence metrics associated with the device, historical scan data associated with the device, or one or more state machine values associated with the device.

8. The apparatus of claim 6, wherein the second state token comprises information regarding one or more of: a most recent location associated with the device, a most recent serving cell associated with the device, an observation variance associated with the device, a location history associated with the device, one or more uncertainties associated with a calculated location, one or more confidence metrics associated with the device, historical location related measurements associated with the device, or one or more state machine values associated with the device.

9. The apparatus of claim 6, further comprising at least one of a transceiver or an antenna coupled to the at least one processor, wherein to transmit the location response, the at least one processor is configured to transmit the location response via at least one of the transceiver or the antenna, wherein the first state token comprises a state identifier (ID), and wherein the state ID is based on a prior location response before the location response.

10. The apparatus of claim 9, wherein the at least one processor is further configured to:

generate the second state token comprising a second state ID;

maintain the second state ID and the second state token before transmission of the location response; and delete the state ID after generation of the second state ID.

11. An apparatus associated with a device, comprising:

at least one memory; and at least one processor coupled to the at least one memory and, based at least in part on information stored in the at least one memory, the at least one processor is configured to:

obtain a current raw location and a device history associated with the device;

determine, based on the current raw location and the device history, at least one processing algorithm;

calculate a smoothed latitude and a smoothed longitude; and determine an adjusted location based on the current raw location, the device history, and the at least one processing algorithm, wherein the adjusted location is further based on the smoothed latitude and the smoothed longitude and at least one of: a time elapsed between the current raw location and a last updated location exceeds a time threshold, a distance between the current raw location and the last updated location exceeds a distance threshold, the current raw location is outside of a prior area of uncertainty, the last updated location is outside of a current area of uncertainty, or a change of standard deviation associated with the smoothed latitude and the smoothed longitude being higher than a standard deviation threshold.

12. The apparatus of claim 11, wherein to obtain the current raw location, the at least one processor is configured to:

transmit, to a server, a location request for the current raw location; and receive, from the server based on the location request, the current raw location.

13. The apparatus of claim 11, wherein to obtain the current raw location, the at least one processor is configured to:

determine, based on a global navigation satellite system (GNSS) or a sensor, the current raw location.

14. The apparatus of claim 11, wherein the at least one processing algorithm comprises an accuracy enhancement algorithm, and wherein to determine the adjusted location, the at least one processor is configured to:

determine whether a change of precision associated with a comparison of the current raw location and the last updated location exceeds an upper bound or a lower bound; and determine, based on the change of precision exceeding the upper bound, the adjusted location to be equal to the last updated location;

determine, based on the change of precision exceeding the lower bound, the adjusted location to be equal to the current raw location; or calculate, based on the change of precision not exceeding the upper bound or the lower bound, the smoothed latitude and the smoothed longitude and determine the adjusted location based on the smoothed latitude and the smoothed longitude.

15. The apparatus of claim 11, wherein the at least one processing algorithm comprises an accuracy enhancement algorithm.

16. The apparatus of claim 11, wherein the at least one processing algorithm comprises a noise reduction algorithm, and wherein to determine the adjusted location, the at least one processor is configured to:

calculate at least one rate of change limit associated with the current raw location and the last updated location;

determine the adjusted location to be equal to the current raw location based on the at least one rate of change associated with the current raw location and the last updated location being smaller than the at least one rate of change limit; or determine the adjusted location to be equal to the last updated location based on the at least one rate of change associated with the current raw location and the last updated location being larger than the at least one rate of change limit.

17. The apparatus of claim 11, further comprising at least one of a transceiver or an antenna coupled to the at least one processor, wherein to obtain the current raw location and the device history, the at least one processor is configured to obtain the current raw location and the device history via at least one of the transceiver or the antenna, wherein the at least one processor is further configured to:

determine a second current raw location and a second device history associated with the device;

determine, based on the second current raw location and the second device history, at least one second processing algorithm, wherein the second device history and the device history are associated with a same maximum data size; and determine a second adjusted location based on the second current raw location, the second device history, and the at least one second processing algorithm.

18. A method performed by a location server, comprising:

receiving a location request associated with a device;

determining a current raw location and a device history associated with the device;

determining, based on the current raw location and the device history, at least one processing algorithm;

calculating a smoothed latitude and a smoothed longitude;

determining an adjusted location based on the current raw location, the device history, and the at least one processing algorithm, wherein the adjusted location is further based on the smoothed latitude and the smoothed longitude and at least one of: a time elapsed between the current raw location and a last updated location exceeds a time threshold, a distance between the current raw location and the last updated location exceeds a distance threshold, the current raw location is outside of a prior area of uncertainty, the last updated location is outside of a current area of uncertainty, or a change of standard deviation associated with the smoothed latitude and the smoothed longitude being higher than a standard deviation threshold; and transmitting, for the device, a location response including the adjusted location.

19. The method of claim 18, wherein the at least one processing algorithm comprises an accuracy enhancement algorithm, and wherein determining the adjusted location comprises:

determining whether a change of precision associated with a comparison of the current raw location and the last updated location exceeds an upper bound or a lower bound; and determining, based on the change of precision exceeding the upper bound, the adjusted location to be equal to the last updated location;

determining, based on the change of precision exceeding the lower bound, the adjusted location to be equal to the current raw location; or calculating, based on the change of precision not exceeding the upper bound or the lower bound, the smoothed latitude and the smoothed longitude and determine the adjusted location based on the smoothed latitude and the smoothed longitude.

20. The method of claim 18, wherein the at least one processing algorithm comprises a noise reduction algorithm.

21. The method of claim 18, wherein the at least one processing algorithm comprises an outlier filtering algorithm, and wherein determining the adjusted location comprises:

calculating at least one rate of change limit associated with the current raw location and the last updated location;

determining the adjusted location to be equal to the current raw location based on the at least one rate of change associated with the current raw location and the last updated location being smaller than the at least one rate of change limit; or determining the adjusted location to be equal to the last updated location based on the at least one rate of change associated with the current raw location and the last updated location being larger than the at least one rate of change limit.

22. The method of claim 18, further comprising:

receiving a second location request associated with the device;

determining a second current raw location and a second device history associated with the device;

determining, based on the second current raw location and the second device history, at least one second processing algorithm, wherein the second device history and the device history are associated with a same maximum data size;

determining a second adjusted location based on the second current raw location, the second device history, and the at least one second processing algorithm; and transmitting, for the device, a second location response including the second adjusted location.

23. A method performed by an apparatus associated with a device, comprising:

obtaining a current raw location and a device history associated with the device;

determining, based on the current raw location and the device history, at least one processing algorithm;

calculating a smoothed latitude and a smoothed longitude; and determining an adjusted location based on the current raw location, the device history, and the at least one processing algorithm, wherein the adjusted location is further based on the smoothed latitude and the smoothed longitude and at least one of: a time elapsed between the current raw location and a last updated location exceeds a time threshold, a distance between the current raw location and the last updated location exceeds a distance threshold, the current raw location is outside of a prior area of uncertainty, the last updated location is outside of a current area of uncertainty, or a change of standard deviation associated with the smoothed latitude and the smoothed longitude being higher than a standard deviation threshold.

24. The method of claim 23, wherein obtaining the current raw location further comprises:

transmitting, to a server, a location request for the current raw location; and receiving, from the server based on the location request, the current raw location.

25. The method of claim 23, wherein obtaining the current raw location further comprises:

determining, based on a global navigation satellite system (GNSS) or a sensor, the current raw location.

26. The method of claim 23, wherein the at least one processing algorithm comprises an accuracy enhancement algorithm, and wherein determining the adjusted location comprises:

determining whether a change of precision associated with a comparison of the current raw location and the last updated location exceeds an upper bound or a lower bound; and determining, based on the change of precision exceeding the upper bound, the adjusted location to be equal to the last updated location;

determining, based on the change of precision exceeding the lower bound, the adjusted location to be equal to the current raw location; or calculating, based on the change of precision not exceeding the upper bound or the lower bound, the smoothed latitude and the smoothed longitude and determine the adjusted location based on the smoothed latitude and the smoothed longitude.

27. The method of claim 23, wherein the at least one processing algorithm comprises a noise reduction algorithm.

28. The method of claim 23, wherein the at least one processing algorithm comprises an outlier filtering algorithm, and wherein determining the adjusted location comprises:

calculating at least one rate of change limit associated with the current raw location and the last updated location;

determining the adjusted location to be equal to the current raw location based on the at least one rate of change associated with the current raw location and the last updated location being smaller than the at least one rate of change limit; or determining the adjusted location to be equal to the last updated location based on the at least one rate of change associated with the current raw location and the last updated location being larger than the at least one rate of change limit.

29. The method of claim 23, further comprising:

determining a second current raw location and a second device history associated with the device;

determining, based on the second current raw location and the second device history, at least one second processing algorithm, wherein the second device history and the device history are associated with a same maximum data size; and determining a second adjusted location based on the second current raw location, the second device history, and the at least one second processing algorithm.

30. The method of claim 23, further comprising:

causing a screen associated with the device to render the
   adjusted location.

* * * * *